United States Patent
Rudkin et al.

(10) Patent No.: US 8,260,959 B2
(45) Date of Patent: Sep. 4, 2012

(54) NETWORK SERVICE SELECTION

(75) Inventors: Steven Rudkin, Ipswich (GB); Peter Van Nieuwenhuizen, Cambridge (GB)

(73) Assignee: British Telecommunications public limited company, London (GB)

( * ) Notice: Subject to any disclaimer, the term of this patent is extended or adjusted under 35 U.S.C. 154(b) by 644 days.

(21) Appl. No.: 10/502,851

(22) PCT Filed: Jan. 31, 2003

(86) PCT No.: PCT/GB03/00446
§ 371 (c)(1),
(2), (4) Date: Jul. 29, 2004

(87) PCT Pub. No.: WO03/065653
PCT Pub. Date: Aug. 7, 2003

(65) Prior Publication Data
US 2006/0149854 A1    Jul. 6, 2006

(30) Foreign Application Priority Data

Jan. 31, 2002  (EP) .................................. 02250674

(51) Int. Cl.
*G06F 15/173* (2006.01)

(52) U.S. Cl. ........ 709/241; 709/224; 709/226; 370/230; 370/231; 370/235; 705/7.31; 705/400

(58) Field of Classification Search .................. 709/224, 709/226, 241
See application file for complete search history.

(56) References Cited

U.S. PATENT DOCUMENTS

| | | |
|---|---|---|
| 5,367,523 A | 11/1994 | Chang et al. |
| 5,408,465 A | 4/1995 | Gusella et al. |
| 5,446,730 A | 8/1995 | Lee et al. |
| 5,600,638 A | 2/1997 | Bertin et al. |
| 5,680,389 A | 10/1997 | Douglas et al. |
| 5,809,078 A | 9/1998 | Tani et al. |
| 5,875,175 A | 2/1999 | Sherer et al. |
| 5,917,822 A | 6/1999 | Lyles et al. |

(Continued)

FOREIGN PATENT DOCUMENTS

EP    0 848 560    6/1998

(Continued)

OTHER PUBLICATIONS

"Market Managed Multi-Service Internet, Deliverable Pricing Mechanisms Pt II", Jul. 10, 2000, pp. 1-24.*

(Continued)

*Primary Examiner* — Backhean Tiv
(74) *Attorney, Agent, or Firm* — Nixon & Vanderhye P.C.

(57) ABSTRACT

A method of selecting a suitable service for the delivery of a communication across an integrated network is disclosed. Before now, users had to select the service that best suited their needs at the time of each delivery. By providing a computer programmed to act as a purchasing agent with data indicating the desirability of stability in the network service (that data representing the price the user is prepared to pay for stability) an automatic selection of the service to be provided to the communication is enabled. An embodiment is described in which different degrees of stability are given to different content file deliveries in dependence on the importance attached to the recipient by a content provider. The invention could equally be used to provide an appropriate services for many different types of network traffic.

19 Claims, 27 Drawing Sheets

U.S. PATENT DOCUMENTS

| | | | |
|---|---|---|---|
| 5,948,069 A * | 9/1999 | Kitai et al. | 709/240 |
| 5,991,306 A | 11/1999 | Burns et al. | |
| 5,991,810 A | 11/1999 | Shapiro et al. | |
| 5,995,606 A | 11/1999 | Civanlar et al. | |
| 6,029,203 A | 2/2000 | Bhatia et al. | |
| 6,041,039 A | 3/2000 | Kilkki et al. | |
| 6,073,175 A | 6/2000 | Tavs et al. | |
| 6,078,919 A | 6/2000 | Ginzburg et al. | |
| 6,104,720 A | 8/2000 | Kisor | |
| 6,108,306 A * | 8/2000 | Kalkunte et al. | 370/235 |
| 6,108,307 A | 8/2000 | McConnell et al. | |
| 6,144,996 A | 11/2000 | Starnes et al. | |
| 6,154,778 A | 11/2000 | Koistinen et al. | |
| 6,229,788 B1 | 5/2001 | Graves et al. | |
| 6,243,754 B1 * | 6/2001 | Guerin et al. | 709/227 |
| 6,304,544 B1 | 10/2001 | Shimivassan et al. | |
| 6,330,586 B1 * | 12/2001 | Yates et al. | 709/201 |
| 6,345,300 B1 | 2/2002 | Bakshi et al. | |
| 6,374,301 B1 | 4/2002 | Melen | |
| 6,449,650 B1 | 9/2002 | Westfall et al. | |
| 6,483,805 B1 | 11/2002 | Davies et al. | |
| 6,513,061 B1 | 1/2003 | Ebata et al. | |
| 6,538,989 B1 | 3/2003 | Carter et al. | |
| 6,539,425 B1 | 3/2003 | Stevens et al. | |
| 6,556,998 B1 | 4/2003 | Mukherjee et al. | |
| 6,567,893 B1 | 5/2003 | Challenger et al. | |
| 6,594,246 B1 | 7/2003 | Jorgensen | |
| 6,621,895 B1 * | 9/2003 | Giese | 379/201.03 |
| 6,631,122 B1 * | 10/2003 | Arunachalam et al. | 370/332 |
| 6,654,374 B1 * | 11/2003 | Fawaz et al. | 370/394 |
| 6,668,046 B1 * | 12/2003 | Albal | 379/119 |
| 6,678,793 B1 | 1/2004 | Doyle | |
| 6,690,929 B1 * | 2/2004 | Yeh | 455/406 |
| 6,691,148 B1 | 2/2004 | Zinky et al. | |
| 6,724,727 B2 * | 4/2004 | Counterman | 370/235 |
| 6,725,265 B1 | 4/2004 | Challenger et al. | |
| 6,744,767 B1 | 6/2004 | Chiu et al. | |
| 6,772,214 B1 | 8/2004 | McClain et al. | |
| 6,775,519 B1 | 8/2004 | Wiederman et al. | |
| 6,801,501 B1 * | 10/2004 | Knightly et al. | 370/233 |
| 6,816,456 B1 | 11/2004 | Tse-Au | |
| 6,822,940 B1 | 11/2004 | Zavalkovsky et al. | |
| 6,834,341 B1 | 12/2004 | Bahl et al. | |
| 6,842,783 B1 | 1/2005 | Boivie et al. | |
| 6,859,827 B2 | 2/2005 | Banginwar | |
| 6,910,024 B2 * | 6/2005 | Krishnamurthy et al. | 705/400 |
| 6,944,128 B2 | 9/2005 | Nichols | |
| 6,983,139 B2 | 1/2006 | Dowling et al. | |
| 6,999,421 B1 | 2/2006 | Holzworth et al. | |
| 7,006,530 B2 * | 2/2006 | Spinar et al. | 370/468 |
| 7,020,086 B2 * | 3/2006 | Juttner et al. | 370/238 |
| 7,054,267 B2 * | 5/2006 | Ramanan et al. | 370/229 |
| 7,085,737 B2 | 8/2006 | Dan et al. | |
| 7,116,682 B1 | 10/2006 | Waclawsky et al. | |
| 7,184,398 B2 * | 2/2007 | McKinnon et al. | 370/230 |
| 7,185,070 B2 * | 2/2007 | Paul et al. | 709/220 |
| 7,209,437 B1 | 4/2007 | Hodgkinson et al. | |
| 7,227,842 B1 * | 6/2007 | Ji et al. | 370/235 |
| 7,362,775 B1 | 4/2008 | Moskowitz | |
| 7,367,054 B2 * | 4/2008 | Soppera | 726/13 |
| 7,412,514 B2 | 8/2008 | Shuster | |
| 7,433,311 B1 * | 10/2008 | Kalyanasundaram et al. | 370/235 |
| 7,437,449 B1 * | 10/2008 | Monga et al. | 709/224 |
| 7,447,151 B2 * | 11/2008 | McDysan | 370/231 |
| 7,453,801 B2 * | 11/2008 | Taneja et al. | 370/230 |
| 7,515,583 B2 * | 4/2009 | Kamani et al. | 370/352 |
| 2001/0016822 A1 | 8/2001 | Bessette | |
| 2001/0025310 A1 * | 9/2001 | Krishnamurthy et al. | 709/223 |
| 2001/0027484 A1 * | 10/2001 | Nishi | 709/223 |
| 2002/0003806 A1 * | 1/2002 | McKinnon et al. | 709/437 |
| 2002/0013849 A1 | 1/2002 | Schweitzer et al. | |
| 2002/0055906 A1 * | 5/2002 | Katz et al. | 705/39 |
| 2002/0095391 A1 * | 7/2002 | Swart et al. | 705/400 |
| 2002/0107908 A1 * | 8/2002 | Dharanikota | 709/203 |
| 2002/0145981 A1 * | 10/2002 | Klinker et al. | 370/244 |
| 2002/0152305 A1 | 10/2002 | Jackson et al. | |
| 2003/0087673 A1 * | 5/2003 | Walton et al. | 455/562 |
| 2003/0088671 A1 * | 5/2003 | Klinker et al. | 709/225 |
| 2003/0093414 A1 * | 5/2003 | Litzow et al. | 707/3 |
| 2003/0115480 A1 * | 6/2003 | McDysan | 713/201 |
| 2003/0135609 A1 * | 7/2003 | Carlson et al. | 709/224 |
| 2003/0145100 A1 * | 7/2003 | Marchetto et al. | 709/233 |
| 2003/0152039 A1 | 8/2003 | Roberts | |
| 2004/0090914 A1 | 5/2004 | Briscoe et al. | |
| 2004/0117426 A1 | 6/2004 | Rudkin et al. | |
| 2004/0192324 A1 | 9/2004 | Rudkin | |
| 2005/0021796 A1 | 1/2005 | McClain et al. | |
| 2006/0178918 A1 * | 8/2006 | Mikurak | 705/7 |
| 2007/0038523 A1 * | 2/2007 | Komem et al. | 705/26 |
| 2010/0302943 A1 * | 12/2010 | Rawlins et al. | 370/231 |

FOREIGN PATENT DOCUMENTS

| | | | |
|---|---|---|---|
| EP | 0848560 | * | 6/1998 |
| EP | 0 899 916 A2 | | 3/1999 |
| EP | 1 113 629 | | 7/2001 |
| GB | 2 311 439 | | 9/1997 |
| WO | WO 94/14263 | | 6/1994 |
| WO | 9824208 A2 | | 6/1998 |
| WO | WO 99/13624 | | 3/1999 |
| WO | 99/65184 | | 12/1999 |
| WO | 99/65185 | | 12/1999 |
| WO | WO 00/13390 | | 3/2000 |
| WO | WO 00/14919 | | 3/2000 |
| WO | WO 00/35130 | | 6/2000 |
| WO | WO 01/52475 | | 7/2001 |

OTHER PUBLICATIONS

Liu, Z et al., Usage-based versus flat pricing for e-business services with differentiated QoS, pp. 1-14.*

Duan, Zhenhai, et al., Service Overlay networks: SLAs, QoS and Bandwidth Provisioning, 2002, IEEE, pp. 1-10.*

Han, Lin-na, et al., Research on Node-State in QoS based Networks, 2005, IEEE, pp. 1-4.*

Saberi, Soheil, et al., Pricing for QoS Provisioning Across Multiple Internet Service Provider Domains, 2007, Springer-Verlag Berlin Heidelberg, pp. 1-11.*

Zachariadis, Grigorios, et al, Income Maximization using Prices and QoS for a Multi-Class Telecommunications System, Feb. 2007, IEEE Communications Letters, vol. 11, No. 2, pp. 1-3.*

Courcoubetis et al., "An Auction Mechanism for Bandwidth Allocation Over Paths," Dept. of Informatics, Athens University of Economics and Business, 11 pgs., http://nes.aueb.gr/publications/2001.ITC.bandwidthauctions.pdf.

Key et al., "User policies in a network implementing congestion pricing," pp. 1-8 http://citeseer.ist.psu.edu/cache/papers/cs/15319/http:zSzzSzresearch.microsoft.comzSzuserszSzimassoulzSzbos.

"Market Managed Multi-Service Internet, Deliverable 3 Pricing Mechanisms Pt II," EU-funded M31 Project (2000) pp. 1-24.

Chapter 12 entitled "Economics" of training course possibly given at University of California at Berkeley in Jul. 1995, pp. 291-321.

U.S. Appl. No. 10/482,911, filed Jan. 6, 2004, Rudkin.

U.S. Appl. No. 10/469,786, filed Sep. 4, 2003, Briscoe et al.

U.S. Appl. No. 10/474,901, filed Oct. 16, 2003, Rudkin et al.

Office Action dated Nov. 26, 2008 in U.S. Appl. No. 10/482,911.

Office Action dated May 16, 2007 in U.S. Appl. No. 10/469,786.

Office Action dated Mar. 11, 2008 in U.S. Appl. No. 10/469,786.

Office Action dated May 14, 2008 in U.S. Appl. No. 10/469,786.

Office Action dated Sep. 5, 2008 in U.S. Appl. No. 10/469,786.

Office Action dated May, 26, 2009 in U.S. Appl. No. 10/474,901.

Office Action dated Sep. 29, 2008 in U.S. Appl. No. 10/474,901.

Office Action dated Nov. 16, 2007 in U.S. Appl. No. 10/474,901.

Office Action dated May 18, 2007 in U.S. Appl. No. 10/474,901.

Elson et al., "ICAP The internet Content Adaptation Protocol," circa Dec. 2000, http://www.i-cap.org/icap/media/draft-opes-icap-00.1.

G. MacLarty & M. Fry, Policy-based content delivery: an active network approach, 2001, Elsevier Science B.V. pp. 241-248.

Feng, et al., "Adaptive Packet Marking for Maintaining End-to-End Throughput in a Differentiated-Services Internet," IEEE/ACM Transactions on Networking, vol. 7, No. 5, Oct. 1999.

Chen, et al., "An Architecture for Noncooperative QoS Provision in Many-Switch Systems," Department of Computer Sciences, Purdue University, West Lafayette, IN, pp. 864-872.

Cheng, "Quality of Services Based on Both Call Admission and Cell Scheduling", Computer Networks and ISDN Systems 29 (1997), pp. 555-567.

Crowcroft et al., "A Rough Comparison of the IETF and ATM Service Models", IEEE Network Nov./Dec. 1995, pp. 11-16.

Bolla et al., "Adaptive Access Control of Multiple Traffic Classes in ATM Networks", GLOBECOM '91, vol. 1, Dec. 1991, pp. 0331-0338.

Floyd et al., "Link-Sharing and Resource Management Models for Packet Networks", IEEE/ACM Transactions on Networking, vol. 3, No. 4, Aug. 1995, pp. 365-386.

O'Neill, "Internetwork Futures", BT Technology Journal, vol. 15, No. 2, Apr. 1997, pp. 226-239.

White, "RSVP and Integrated Services in the Internet: A Tutorial", IEEE Communications Magazine, May 1997.

Cable Television Laboratories, Inc., Data-Over-Cable Service Interface Specifications, Radio Frequency Interface Specification, SP-RFIv1.1-IO3-991105, 1999.

Lai, Gung-Chou et al., "Support QoS in IP over ATM," Computer Communications 22 (1999) 4111-418.

V. Jacobsen et al., IETF Request for Comments 2958, "An Expedited Forwarding PHB,"Jun. 1999, http://www.ietf org/rfc/rfc2598.tst?number+2598.

S. Blake et al., IETF Request for Comments 2475, "An Architecture for Differentiated Services," Dec. 1998, http:www.ietf.org/rfc/rfc2475.txt?number=2475.

K. Nichols et al., IETF Request for Comments 2474, "Definition of the Differentiated Services Field (DS Field) in the IPv4 and IPv6 Headers," Dec. 1998, http:www.ietf.org/rfc/rfc2474.txt?number=2474.

J. Heinanen et al., ., IETF Request for Comments 2597, "Assured Forwarding PHB Group" Jun. 1999, http:www.ietf.org/rfc/rfc2597.txt?number=2597.

Y. Bernet et al. , A Framework for Use of RSVP with Diff-serv Network, Jun. 1998, http:www.watersprings.org/pub/id/draft-ietf-diffserv-rsvp-00.txt.

R. Braden et al., IETF Request for Comments 1633, "Integrated Services in the Internet Architecture: an Overview," Jun. 1994, http:www.ietf.org/rfc/rfc1633.txt?number=1633.

G. Gross et al., IETF Request for Comments 2364, "PPP Over AAL5,"Jul. 1998, http:www.ietf.org/rfc/rfc2364.txt?number=2364.

IP to ATM Class of Service Phase 1 Design Guide—Cisco document, http://cisco.com/univercd/cc/td/doc/product/software/ios111/cc111/ipatmdg.pdf.

Bottura, G., Charging and Tariffing Functions and Capabilities for MANs, IEEE 92 Network Oper Manage Symp., 1992, pp. 208-218.

D. Simpson, "Internet Service Providers—Anarchy in the UK?," British Telecommunications Engineering Journal, vol. 18, Part 2 Special Aug. 1999 Issue, pp. 92-96.

Shasta 5000 Broadband Service Node, Nortel Networks Product Literature.

"Tarifmodelle gegen Staus auf der Infobahn," Funkschau, No. 8, 1998, pp. 28-30, http://www.funkschau.de/heftarchiv/pdf/1998/fs08/fs9808028.pdf.

D. Estrin et al., "Design Considerations for Usage Accounting and Feedback in Internetworks," Computer Communication Review, vol. 20, Oct. 1990, No. 5.

Murphy, et al., "Distributed pricing for embedded ATM networks," in Proceedings of the International Teletraffic Congress ITC-14, Antibes, France (Jun. 1994).

Jordan, et al., "Connection establishment in high-speed networks," *IEEE Journal on Selected Areas in Communications*, vol. 13, No. 7, pp. 1150-1161 (Sep. 1995).

Mackie-Mason, et al., "Pricing the Internet," in Proceedings of the $2^{nd}$ International Conference on Telecommunications systems Modelling, Nashville, Tennessee, pp. 378-393 (Mar. 24-27, 1994).

Real Broadcast Network White Paper, 9 pages (Apr. 19, 1999).

Rist, "Feeding the Streaming Media Frenzy," Network Computing article, 10 pages (Dec. 4, 2000).

Patrizio, "Long Commitment or One-Night Stand?," 3 pages (2001).

Digital Island literature entitled "Content Delivery Services: Footprint™ Streaming Solutions," 2 pages (undated).

Cable Datacom News article entitled "Distribution Hub," 2 pages (copyright 1996-2001).

Cable Datacom News article entitled "Cable Data Network Architecture," 2 pages (copyright 1996-2001).

Four pages downloaded from http://www.eeng.dcu.ie/~murphyj/dist-price on Jul. 15, 2002.

Seven pages downloaded from http://www.eeng.dcu.ie/~murphyj/band-price on Jul. 15, 2002.

Martignoni S. et al., "Extensio of Classical IP over ATM to support QoS of the application level," 0-7803-4982-2/98/$10 1998 IEEE. pp. 492-499, pp. 494-496 figures 1-3 and 7; tables 1 and 2.

International Search Report mailed Apr. 25, 2003 in PCT/GB03/00446.

* cited by examiner

Fig. 4.

Quality of Delivery Policy for Content File

| | Class of Delivery | Max Risk | Bandwidth (kbits⁻¹) | Utility Acc. Rate (pence/sec) | Penalty for move to 400 | Penalty for move to 250 | Penalty for move to 150 | Penalty for move to 0 |
|---|---|---|---|---|---|---|---|---|
| File Name: Latest gladiator.rm | Gold | 0.01 | 400 | 0.4 | 0 | -0.1 | -0.2 | -10.2 |
| | | | 250 | 0.3 | 0 | 0 | -0.1 | -10.1 |
| | | | 150 | 0.2 | 0 | 0 | 0 | -10 |
| | | | 0 | 0 | 0 | 0 | 0 | 0 |
| File Format Real™ | Silver | 0.02 | 400 | 0.3 | 0 | -0.1 | -0.2 | -10.2 |
| | | | 250 | 0.225 | 0 | 0 | -0.1 | -10.1 |
| | | | 150 | 0.15 | 0 | 0 | 0 | -10 |
| | | | 0 | 0 | 0 | 0 | 0 | 0 |
| File Duration: 3600s | Bronze | 0.05 | 400 | 0.2 | 0 | -0.1 | -0.2 | -10.2 |
| | | | 250 | 0.15 | 0 | 0 | -0.1 | -10.1 |
| | | | 150 | 0.1 | 0 | 0 | 0 | -10 |
| | | | 0 | 0 | 0 | 0 | 0 | 0 |

Fig.7.

Quality of Delivery Specification for User / Content File combination

| | Class of Delivery | Max Risk | Bandwidth (kbits$^{-1}$) | Utility Acc. Rate (pence/sec) | Penalty for move to 400 | Penalty for move to 250 | Penalty for move to 150 | Penalty for move to 0 |
|---|---|---|---|---|---|---|---|---|
| File Duration: 3600s Source address: 198.1.2.3 | Gold | 0.01 | 400 | 0.4 | 0 | -0.1 | -0.2 | -10.2 |
| Source Port: 12345 | | | 250 | 0.3 | 0 | 0 | -0.1 | -10.1 |
| Destination IP address: 195.10.20.30 | | | 150 | 0.2 | 0 | 0 | 0 | -10 |
| | | | 0 | 0 | 0 | 0 | 0 | 0 |

Fig. 11A.

| Cable Network Data | | | |
|---|---|---|---|
| Name of Service Offering | Priority 1 | Priority 2 | Best Effort |
| Number of Service Offering (n) | 1 | 2 | 3 |
| Service Type | Variable-Bandwidth | Variable-Bandwidth | Variable-Bandwidth |
| Price (pence/Mb/s) | 1.2 | 0.9 | 0.5 |
| Available bandwidth (kbs) | 300 | 200 | 50 |
| Volatility Index (k) | 0.15 | 0.25 | 0.4 |

Fig. 11B.

| DSL Network Data | | |
|---|---|---|
| Name of Service Offering | Assured | Active Charge |
| Number of Service Offering (n) | 1 | 2 |
| Service Type | Constant Bit-Rate | Dynamically-Priced |
| Price (pence/Mb/s) | 2.5 | 0.9 |
| Available Bandwidth (kbs) | 2000 | 1000 |
| Volatility Index (k) | n/a | 0.05 |

NETWORK SERVICE SELECTION

This application is the US national phase of international application PCT/GB03/00446 filed 31 Jan. 2003 which designated the U.S. and claims benefit of EP 02250674.5, dated 31 Jan. 2002, the entire content of which is hereby incorporated by reference.

FIELD OF TECHNOLOGY

The present invention relates to a method of selecting network services from a plurality of network services available for a communication.

BACKGROUND

Conventional telephony networks offer a service which reserves 64 kbits$^{-1}$ of the network's capacity for the duration of a user's call. This service is suitable for voice telephony, where a signal representing the voice of the user must be continuously sent across the network to the other party to the conversation. In the trunk links of the telephony network, a number of telephone calls are carried on the link, each having its own timeslot in a sequence of timeslots. This is known in the art as time division multiplexing.

In contrast to telephones, computers send data in bursts (e.g. a Web server might send a page at 1 Mbits$^{-1}$ for a few milliseconds once every minute on average). Reserving 1 Mbits$^{-1}$ permanently for communication from a computer would be inefficient. For this reason, dedicated computer networks offer a different type of service. They do not reserve capacity for a user, but instead offer a service where the resources of the network (or at least a proportion of those resources) are shared indiscriminately between network users. This is known in the art as statistical multiplexing.

The last two decades have seen the introduction of so-called 'integrated' networks which are designed to carry both computer communications and telephony. The capacity of those networks therefore needs to be allocated between users who require a constant bit-rate for the duration of a communication (e.g. telephone users) and those who can tolerate some variation in the bit-rate supplied to them by the network (e.g. those transferring web-pages, software or e-mails).

In order to accommodate the different requirements of different types of communication, one type of integrated network, an Asynchronous Transfer Mode (ATM) network, allows a user to choose between a constant bit-rate service type (in which an amount of bandwidth they request is allocated to them for the duration of a session), a variable bit-rate service type (in which a proportion of the available capacity is shared between a number of users controlled to substantially prevent congestion), and an unspecified bit-rate service type (in which the remaining capacity is simply shared by all users). In the first two types of service, a user can additionally specify the amount of bandwidth he or she wishes to have available. Note that 'service' is to be distinguished from 'service type'—a specification of a required service will include both a service type and an indication of the amount of network resources required by the user.

Similarly, another type of integrated network, an Internet Protocol (IP) network, can also offer a constant bit-rate service type (using the Resource Reservation Protocol (RSVP)), and a best efforts service type which approximates to the unspecified bit-rate service offered by ATM networks. Another service type gives packets sent by one class of users priority over packets sent by another class of user. Using RSVP, a user can additionally specify the amount of bandwidth he or she wishes to have available.

SUMMARY

In summary, integrated networks offer their users the ability to specify the service which they wish to receive from the network (which, being an integrated network, can offer a plurality of different services). This specification can be made once at the start of a communication (the normal procedure in networks offering a connection-oriented service, such as ATM networks) and/or repeatedly during a communication.

Where a person has to make such a service specification many times because he or she is involved in a number of different communications and/or has to make a plurality of service specifications during a communication, it is beneficial if that specification is made on that person's behalf by a computer programmed to act as that person's agent.

An example of a computer programmed in this way is found in PCT application number WO 01/52475. That application describes how a web-server programmed by a content provider requires indicates, in a 'bid', how much the content provider is prepared to pay for three different amounts of constant-bit rate resource for the following thirty second reservation period. That bid is then made repeatedly at thirty second intervals throughout the communication. The resources of the network are then allocated between communications by a bandwidth broker computer which receives current bids from all those requiring reserved capacity on the network.

This arrangement is deficient in that the web-server is unable to give any indication of the type of service the content provider requires from the network. This leads to an inefficient allocation of network resources and means that the programmed computer can only be used with networks which offer a constant bit-rate service type for a predetermined reservation period.

European Patent application 0 848 560 and U.S. Pat. No. 6,104,720 both disclose an apparatus which selects between a plurality of service types in accordance with Quality of Service parameters input by a user. The QoS parameters considered include throughput, packet loss, latency and jitter.

According to a first aspect of the present invention, there is provided a method of selecting a network service from a plurality of network services available for a communication, said method comprising:

storing utility data representing the utility of one or more corresponding levels of communication resource provided for said communication during said communication;

storing an indication of the stability in the amount of said communications resource provided for a communication by one or more services offered by said network;

calculating, from said service stability data, one or more measures of the likelihood of a predetermined variation occurring in the amount of resource provided for said communication by a service at a future time during said communication;

selecting, in dependence upon said likelihood measures and said utility data, a network service for said communication.

By calculating the expected utility offered by candidate network services from service stability data and utility accumulation rate data for different levels of communication resource, a more efficient method of allocating a network's resources between calls than has hitherto been achieved is provided.

Utility is here meant in an economic sense—i.e. the utility of a service represents the price a purchaser is prepared to pay for that service. Where a service is charged for per unit time, the utility accumulation rate may be used.

Utility represents a preferred measure of the importance of a service to a person requiring that network service. The demand for money or money's worth from the person requiring the communication results in that person genuinely indicating the importance of the service to him or her. Where other indications of importance are used, a user may just indicate that all communications he or she requires are of high importance.

The present invention is useful both in situations where said selection step involves a determination of what service to request for said communication and where said selection step involves a determination of what service to provide for said communication.

Preferably, said service stability data comprises data defining a probability density function defining the likelihood of a variable lying within a range of values at a time after said selection, wherein said variable determines the amount of resource provided for a communication by a service. The variable might represent the amount of bandwidth available for said communication in a variable-bandwidth service or the price of a dynamically-priced service.

A dynamically-priced service is one where constant bit-rate reservations can be made, but for a predetermined reservation period that is shorter than the duration of many communications. Furthermore, the cost of reserving that bandwidth may change from one reservation period to the next.

Preferably, the maximum of said probability density function is set to the value of said variable at the time of said selection. This embodies an assumption that it is more likely that the amount of resource or the price of a fixed amount of resource will stay the same than it is that any other specific variation will occur. Alternatively, the probability density functions could reflect the time-of-day at which the communication is made.

In other embodiments which involve prediction, said utility data comprises utility accumulation data which might itself comprise one or more utility accumulation rates.

Preferably, in embodiments involving prediction and using utility accumulation rates as indicia of the importance of a given service, said utility accumulation data comprises one or more utility indications each comprising a transmission rate and an associated utility accumulation rate for that rate;
said likelihood calculation involves calculating measures of the likelihood of said service type providing said communication with said transmission rate at said future time; and
said selection involves calculating an expectation of the surplus which would be accumulated by said communication over a predetermined period were said service type to be selected, the calculation of said expectation involving calculating the sum of the products of said likelihood, the associated utility accumulation rate and the duration of said predetermined period.

The predetermined period may either be:
i) the duration of the communication if the selection is made at the start of the communication; or, where the selection is made during the communication:
ii) a known reservation period; or
iii) the duration of the remainder of the communication.

Where data associating the resources provided to the user with a utility accumulation rate is available, it is possible to calculate an expectation of the surplus that will be accumulated over said predetermined period for variable-bandwidth services (i.e. services which involve statistical multiplexing of a plurality of communications), constant bit-rate services and dynamically-priced services. Hence, the utility (expected to be accumulated over said predetermined period) of a communication supported by each of these types of services can be calculated. This enables a comparison of any of those service types with one another and the selection of the service type which best suits the requirements of the person (or his agent) requesting the communication.

In preferred embodiments, the expected surplus additionally takes into account a penalty the user associates with moving from one transmission rate to another. Penalties might only be associated with drops in bandwidth or might be associated with increases in the amount of bandwidth allocated to a communication as well. The penalties may take the form of a one-off cost to be subtracted from the expected surplus.

According to a second aspect of the present invention there is provided a network service selection apparatus comprising:
a storage medium having recorded therein processor readable code processable to select a network service for a communication, said code comprising:
stability desirability data reading code processable to read one or more stored utility accumulation rates representing the utility of one or more corresponding levels of communication resource provided for said communication during said communication;
likelihood calculation code processable to calculate, from stored service stability data representing an indication of the stability in the amount of said communications resource provided for a communication by one or more services offered by said network, one or more measures of the likelihood of a predetermined variation occurring in the amount of resource provided for said communication by a service at a future time during said communication; and
network service selection code processable to select, in dependence upon said likelihood measures and said one or more utility accumulation rates, a network service for said communication.

According to a third aspect of the present invention, there is provided a program storage device readable by a processing apparatus, said device embodying a program of instructions executable by the processor to perform the steps of the method according to the first aspect of the present invention.

According to a fourth aspect of the present invention, there is provided a method of selecting, during a communication, a network service from a plurality of network services available for said communication, said method comprising:
storing stability desirability data representing the importance of stability in the amount of communication resource provided for said communication during said communication;
identifying the service currently being provided for said communication;
selecting, in dependence upon said stability desirability data and said identified service, a network service for some or all of the remainder of said communication.

This has the advantage of making the likelihood of in-session switching depend upon the importance that the user attaches to stability in the amount of communications resource he receives from the network.

In this fourth aspect, the stability is, at least in part, determined by the selection. For example, if a purchaser is paying for 300 kbits$^{-1}$ of reserved bandwidth prior to a selection between 100 kbits$^{-1}$, 300 kbits$^{-1}$ and 500 kbits$^{-1}$ services for the next part of the communication, the data representing the stability requirement might determine whether the purchaser continues to receive 300 kbits$^{-1}$ or not.

According to a fifth aspect of the present invention, there is provided a method of selecting network services from a plurality of network services available for a communication, said method comprising:

storing stability desirability data representing the importance of stability in the amount of communication resource provided for said communication during said communication; and selecting, in dependence upon said stability desirability data, a network service for said communication.

The present inventors have realised that a single characteristic, the desirability of stability, distinguishes the desirability of a large number of network services. By quantifying a communication's requirement for stability in the amount of resource provided for it, it is possible for a programmed computer to select the most appropriate service for that communication from a network that offers many different services. This enables a more efficient allocation of the resources of that network between communications having different requirements.

Furthermore, quantifying the desirability of stability enables the same computer program and stability desirability data to be used for communications over a variety of networks. This reduces the technical effort that goes into producing bespoke programs for networks offering different services. It might also reduce the amount memory required to store such programs (since one copy of the program can control network service selection for a variety of networks). Yet further, a person wishing to send a similar communication over a plurality of networks need only generate one specification of the service they require for such similar communications.

In one set of embodiments, said method further comprises the step of storing an indication of the stability in the amount of said communications resource provided for a communication by one or more services offered by said network, wherein said selection step involves determining from said service stability indication and said stability desirability data a network service for said communication.

This enables the stability that will be obtained for a communication to be predicted—enabling a selection of a suitable network service for said communication prior to the start of said communication.

Preferably, said method further comprises the step of calculating, from said service stability data, a measure of the likelihood of a predetermined variation occurring in the amount of resource provided for said communication by a service at a future time during said communication.

This has the advantage of simplifying the processing involved in selecting a suitable network service and thereby reducing the load on the processing resources of a computer programmed to perform the above method.

BRIEF DESCRIPTION OF DRAWINGS

By way of example only, specific embodiments of the present invention will now be described with reference to the accompanying Figures in which:

FIG. 4 shows quality of delivery policy data generated by a content provider for a content file;

FIG. 7 shows a user/content-specific quality of delivery specification generated following the first part of a content file request phase of the first embodiment;

FIG. 11A shows network service data stored at the bandwidth broker computer of the cable network of FIG. 2;

FIG. 11B shows network service data stored at the bandwidth broker computer of the DSL network of FIG. 3;

DETAILED DESCRIPTION

Figure 1:
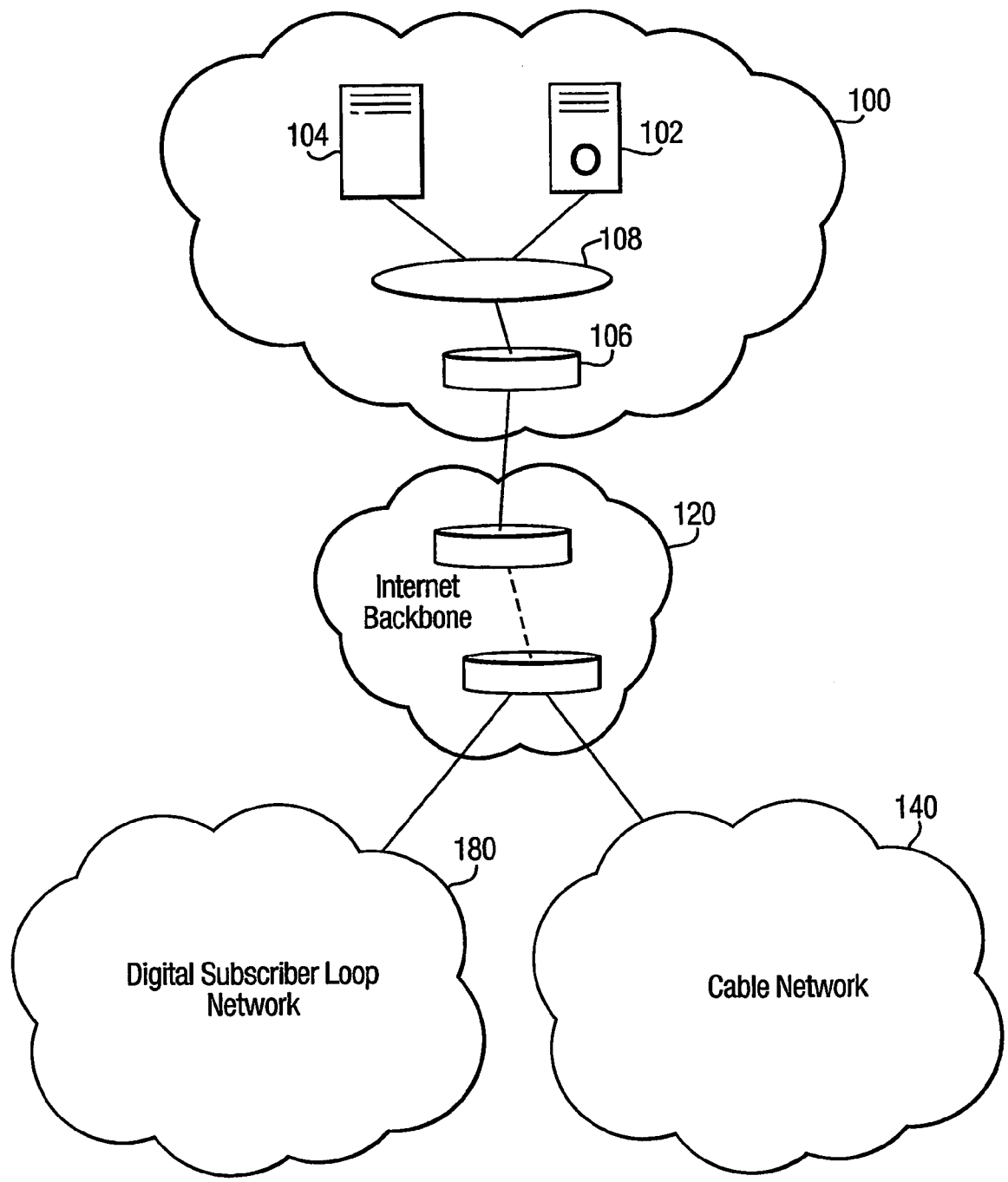
FIG. 1 shows an internetwork in which a first embodiment of the present invention is implemented.

FIG. 1 shows an internetwork comprising a content provider's local area network 100, a regional cable network 140, a regional Digital Subscriber Loop network 180, and a portion of the global Internet 120 which interconnects all three.

The content provider's network 100 comprises a content provider's Web server 102 and origin video server 104, an Internet router 106 and a LAN 108 interconnecting them.

Figure 2:
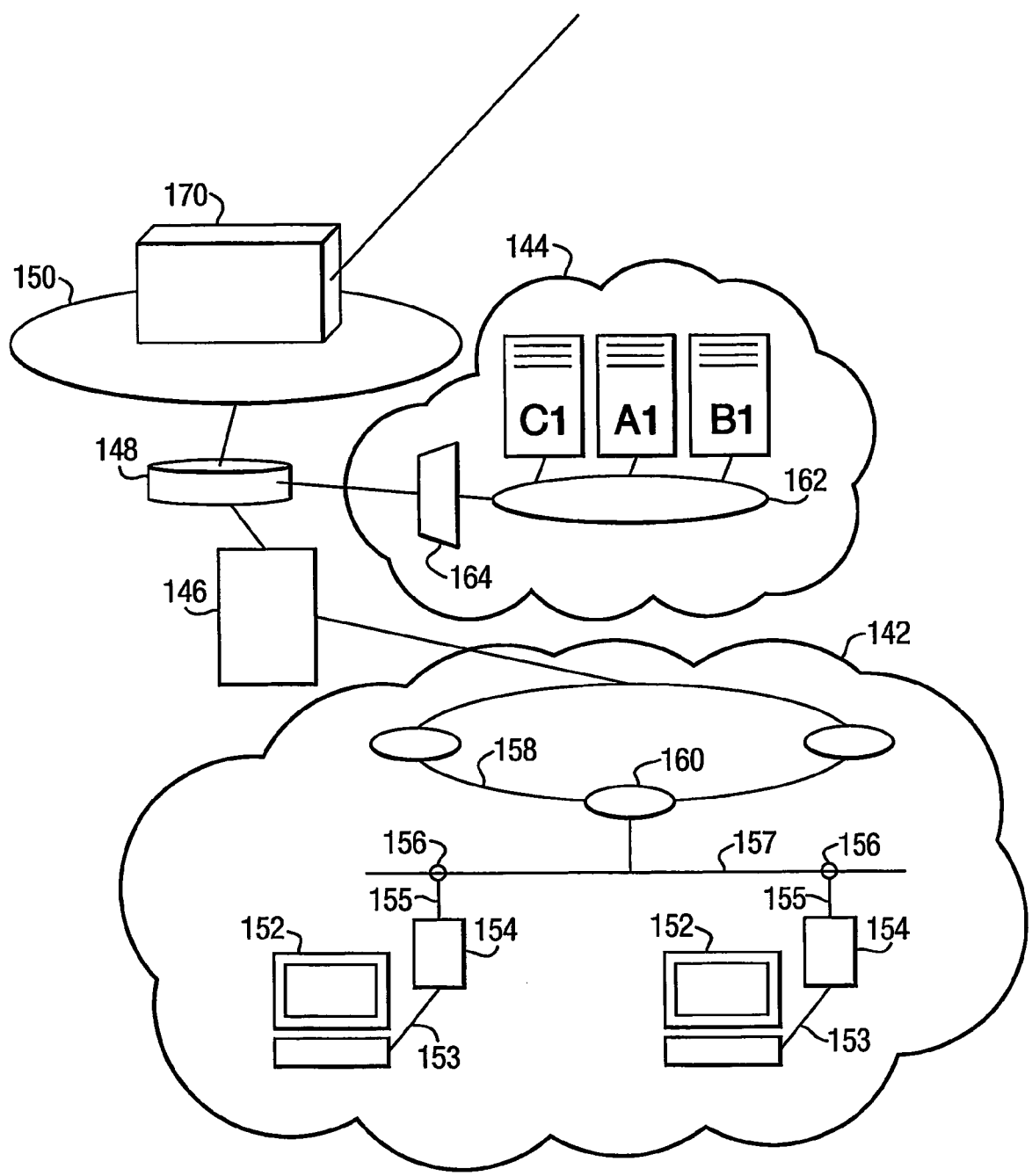
FIG. 2 shows a regional cable network portion of the internetwork of FIG. 1 in more detail.

The regional cable network is illustrated in more detail in FIG. 2. The regional cable network 140 comprises a hybrid fibre/co-axial (HFC) cable network 142, a regional head end 170 which connects the regional cable network to the global Internet 120, a regional fibre network 150, a caching network 144, a Layer 4 switch 148 and a Cable Modem Termination System (CMTS) 146 which interconnects the Layer 4 switch 148 and the HFC cable network 142. The Layer 4 switch interconnects the regional fibre network 150, the caching network 144, and the CMTS 146. A suitable CMTS is the Cisco uBR 7246 which operates in accordance with a pre-standard version of the DOCSIS (Data Over Cable Service Interface Specification) standard version 1.1. The Cisco uBR 7246 also schedules IP packets which transit it in accordance with the value of the so-called Differentiated Services (DS) field in the IP packet header (see the Internet Engineering Task Force's Request For Comments (RFCs) 2474 and 2475 for details of the DS field).

The HFC network 142 comprises a large number of sets of user equipment (152-156), a plurality of co-axial cable networks 157 serving around 700 homes each, a fibre ring 158, and a number of fibre nodes 160, each of which connects the fibre ring 158 to one of the co-axial cable rings 157. Each set of user equipment (152-156) comprises a Toshiba PCX 1100 cable modem 154 (a pre-standard DOCSIS 1.1-compliant cable modem), a Personal Computer (PC) 152, a cable 153 leading from the modem 154 to the PC 152, a cable 155 extending from each set of user equipment to a tap 156 on the co-axial cable ring 157.

The caching local area network 144 comprises an agent computer A1, a content file caching server C1, a shaper/marker 164, a bandwidth broker computer B1, and a Local Area Network 162 which interconnects them. The Local Area Network 162 operates in accordance with the Institute of Electrical and Electronics Engineers (IEEE) 802.3 standard at a rate of 100 Mbits$^{-1}$. The 155 Mbits$^{-1}$ Lucent Access Point 1000 (AP1000) supplied by Lucent Technologies Inc., 600 Mountain Avenue, Murray Hill, N.J., USA would provide a suitable shaper/marker ability.

In accordance with a first embodiment of the present invention, the CMTS 146 is configured as follows. Three diff-serv codepoints (say 111000, 110000, and 000000) are chosen to represent top-priority traffic, mid-priority traffic and best effort traffic respectively. The CMTS/IP Router 146 is able to offer each type of traffic simple priority over traffic of the next lowest level of priority.

The IP router component of the head end 170 is configured to reset (to 000000) the DS fields of packets arriving over the Internet link 9 which have their DS field set to a value which is equated to any other priority level than best effort.

The agent computer A1 is provided with a HyperText Transfer Protocol client program which is configured to use the caching server computer C1 as a proxy (in other words, HTTP requests from the agent computer will be received by the caching server computer C1 and forwarded if the caching server computer itself cannot satisfy the request. HTTP responses to those requests will be received by the caching server computer and forwarded to the agent computer A1).

The regional Digital Subscriber Loop Network (FIG. 3) comprises a user's personal computer 10, an ATM network 2, a cable 12 connecting the user's PC 10 to the ATM network 2, an Internet Service Provider's (ISP's) local area network 4, a Broadband Access Server (BAS) 6, an ATM network link 5 which connects the BAS 6 to the ATM network 2 and an ISP network link 7 which connects the BAS 6 to the ISP's local area network 4. In the present embodiment the BAS is provided by a modified Nortel Networks Shasta 5000 Broadband Service Node. The ISP's local area network 4 is connected to the Internet 120 via an Internet link 9. A charging server 28 is connected to the BAS 6 via a router 32 and a Local Area Network 31.

The ATM network 2 comprises a large number of sets of user equipment (11, 13 14), pairs of copper wires 16 extending from each set of user equipment (11, 13, 14) to a local exchange 20, exchange-housed equipment (17,18) housed in the local telephone exchange building 20 and a wide-area switched network 22 which connects a plurality of such DSLAMs 18 (there is normally one or more DSLAMs per exchange building, only one exchange building is shown in the drawing) to the BAS 6. As will be understood by those skilled in the art, the exchange-housed equipment includes a Digital Subscriber Line Access Multiplexer (DSLAM) 18 shared between many users and, for each pair of copper wires 16, a splitter unit 17 which terminates the pairs of copper wires 16. The splitter unit 17 is effective to send signals within the frequency range used for normal telephony to the Public Switched Telephone Network (not shown) and to send signals in higher frequency bands to the DSLAM 18. Each set of user equipment (11, 13, 14) comprises a splitter unit 14 in a customer's premises which incorporates an Asymmetric Digital Subscriber Line (ADSL) modem 13. The splitter unit 14 is effective to send signals within the frequency range used for normal telephony to the user's telephone 11 and to send signals in higher frequency bands to the ADSL modem 13. The ADSL modem 13 represents the network termination point of the ATM network 2. Cable 12 leads from the modem 13 to the PC 10.

The ISP's local area network 4 comprises an IP router 24, a cache computer C2, an agent computer A2, a bandwidth broker computer B2, and a Local Area Network 30 which interconnects them. The previously mentioned Internet link 9 is connected to the IP router 24. The Local Area Network 30 operates in accordance with the Institute of Electrical and Electronics Engineers (IEEE) 802.3 standard at a rate of 100 Mbits$^{-1}$.

That capacity, the capacity of the ISP link 7 and the ATM network 2 is sufficient to ensure that the rate of transmission of a stream of packets between the caching computer C2 and the personal computer 10 is determined by the BAS 6.

It is to be understood that each of the elements of the internetwork (FIG. 1) operates in accordance with version 6 of the Internet Protocol (IP). Furthermore, at least the caching computer C2 offers the differentiated services extensions to the UNIX sockets interface, or any other programming interface that enables the setting of the Differentiated Services (DS) field in the IP packet header.

In accordance with a first embodiment of the present invention, the ATM network (FIG. 3) is configured by the ATM network operator as follows. Firstly, an ATM permanent virtual circuit (PVC) is configured between the BAS 6 and each of the modems it serves. The PVC is a constant bit rate (CBR) connection whose peak cell-rate is set to 2 Mbits$^{-1}$. The ATM network operator also configures each PC 10 with an IP address. Thereafter a table associating the IP address of each PC with a label that identifies the PVC which leads to that PC 10 is created in the BAS 6 by manual or automatic methods that are well-known to those skilled in the art.

In a conventional manner, the BAS 6 receives a frame constructed in accordance with the link-layer protocol used over the ISP link 7. The link-layer header and/or trailer is then removed from the frame to leave a packet constructed in accordance with the Internet Protocol.

The BAS 6 forwards the packet in a manner which depends upon the DS field of the IP packet header. Thus, a packet may be provided with a constant bit-rate service (where a given amount of bandwidth is reserved for the delivery of the content file), or a best efforts service. On sending packets over the interface, a (Point-to-Point Protocol) PPP link-layer interface header and trailer are added a frame constructed in accordance with the PPP link-layer protocol. The frame thus constructed is then passed through the ATM Adaptation Layer 5 (AAL5) segmentation process in which it is split into ATM cells and sent onto the ATM PVC connection.

Similar processes are carried out for each packet being received from the link-layer interface to the ISP link 7.

The router 24 is configured to reset (to 000000) the DS fields of all packets arriving over the Internet link 9.

Returning now to FIG. 1, the content provider's Web server computer 102 is provided with a web server program, and a program for preparing delivery policies for content files.

The web server program controls the Web server computer 102 to send web-pages requested by a user to that user and to gather information about users in order to enable the quality of the delivery provided to a user to depend upon the user's identity. In the present embodiment, this is achieved by asking users to fill in a HyperText Mark Up Language (HTML) form in order to register with the web-site. The form asks the user for a user name and password and various other data such as the user's age, gender, nationality and occupation category. The information provided is used to assign a user to a user class. A table giving the class of each user is stored at the Web server 102. Those skilled in the art would be able to write a suitable Web server program.

Using the program for preparing delivery policies for content files, the content provider also creates a delivery policy (FIG. 4) for each content file. The program asks the content provider to indicate:
i) the name of the content file;
ii) the format of the content file;
iii) the duration of the content file in seconds;
iv) for each class of delivery, the maximum risk of premature delivery cessation which the purchaser considers acceptable;
v) for each class of delivery, for each of one or more indicated services (in the present case, the choice of services to indicate (i.e. to list) is made by the purchaser and each indicated service is specified by a transmission rate), a utility accumulation rate (in pence/sec) representing how valuable that indicated service is to the content provider;
vii) for each of the one or more indicated services a one-off utility penalty (in pence) occasioned by the transmission rate offered by the network dropping such that the rate drops to the rate associated with the immediately lower indicated service, including the penalty associated with dropping from the lowest rate to no transmission at all. In fact an indicated service of zero bandwidth is assumed which offers the user no utility.

In the present example, for each class of delivery, the user inputs parameters for three indicated services, namely—400 kbits$^{-1}$, 250 kbits$^{-1}$ and 100 kbits$^{-1}$. The delivery policy generation program then produces a data structure containing the data seen in FIG. 4—the penalties associated with a drop through more than one indicated service are calculated by the delivery policy generation program from the penalties supplied by the content provider.

Those skilled in the art will have no difficulty in providing a program to collect the above data and generate the delivery policy data structure shown in FIG. 4.

Figure 3:
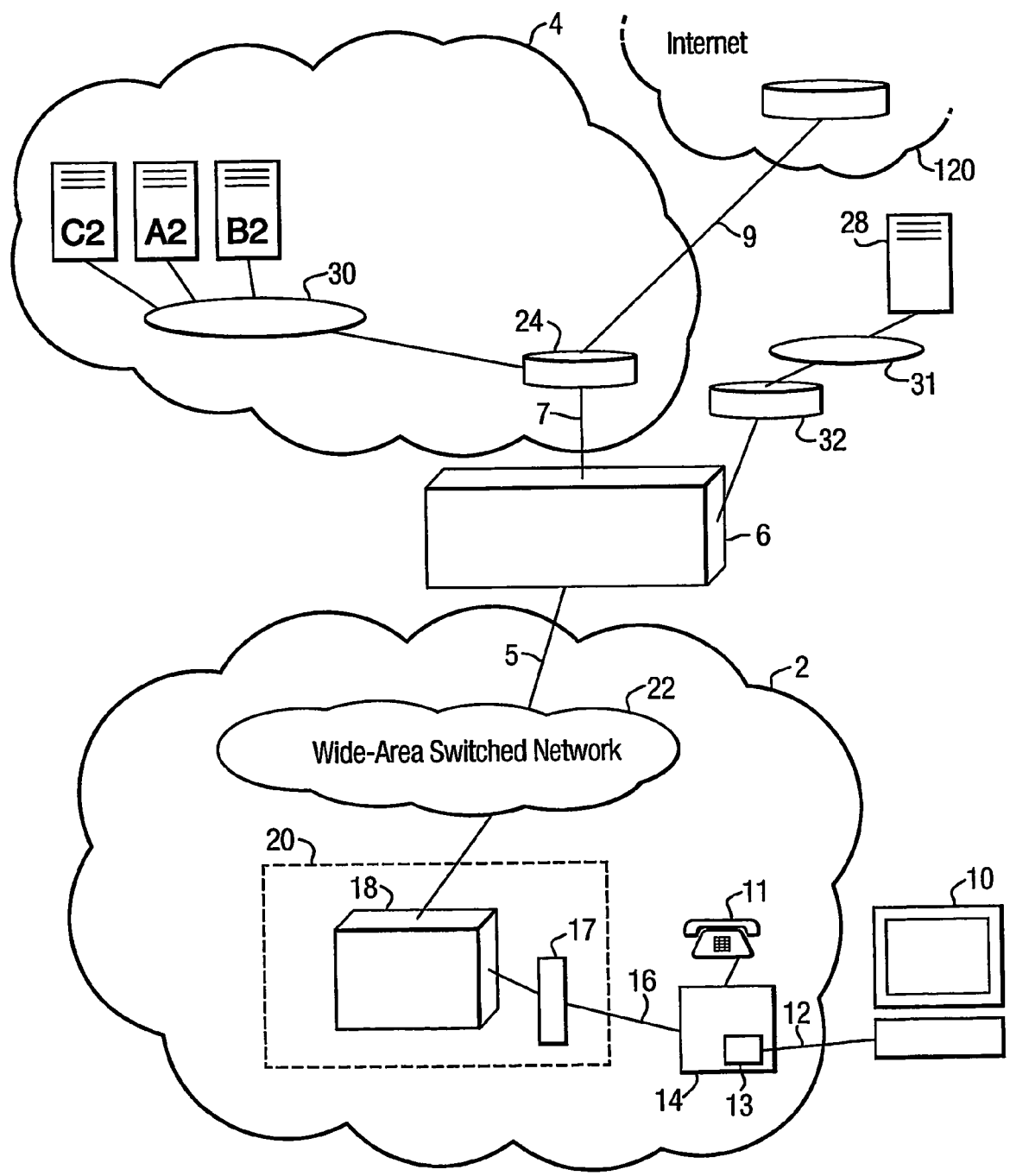
FIG. 3 shows a regional Digital Subscriber Loop network portion of the internetwork of FIG. 1 in more detail.

Once created the content provider stores the delivery policy at a URL having a predetermined relationship to the content file's name—for example the content provider owning the domain name cp.com might store its delivery policy file for the content file www.cp.com/latest/gladiator.rm at: http://www.cp.com/qospolicy/latest/gladiator.rm The content provider then includes the URLs pointing to its delivery policy files in the list of files which it wishes to be copied to caching servers such as caching server C1 in the regional cable network (FIG. 2) and caching server C2 in the DSL regional network (FIG. 3). As will be understood by those skilled in the art, content distributors offer a service in which they copy specified files from an origin server to caches around the world. In the present embodiment, use of such a service results in the content files stored on origin video server computer 104 being copied to the caching servers C1 and C2, together with the content provider's delivery policy files associated with those content files.

FIGS. 5, 6, 7 and 8 illustrate the operations carried out by the customer's PC 152, the content provider's origin Web server O, and the cable network's (FIG. 3) agent computer A1, caching server C1 and bandwidth broker B1 in carrying out the method of the present embodiment. In fact, the steps carried out by the personal computer 152 are carried out under the control of a conventional browser program such as Netscape's Navigator version 4.

Figure 5:
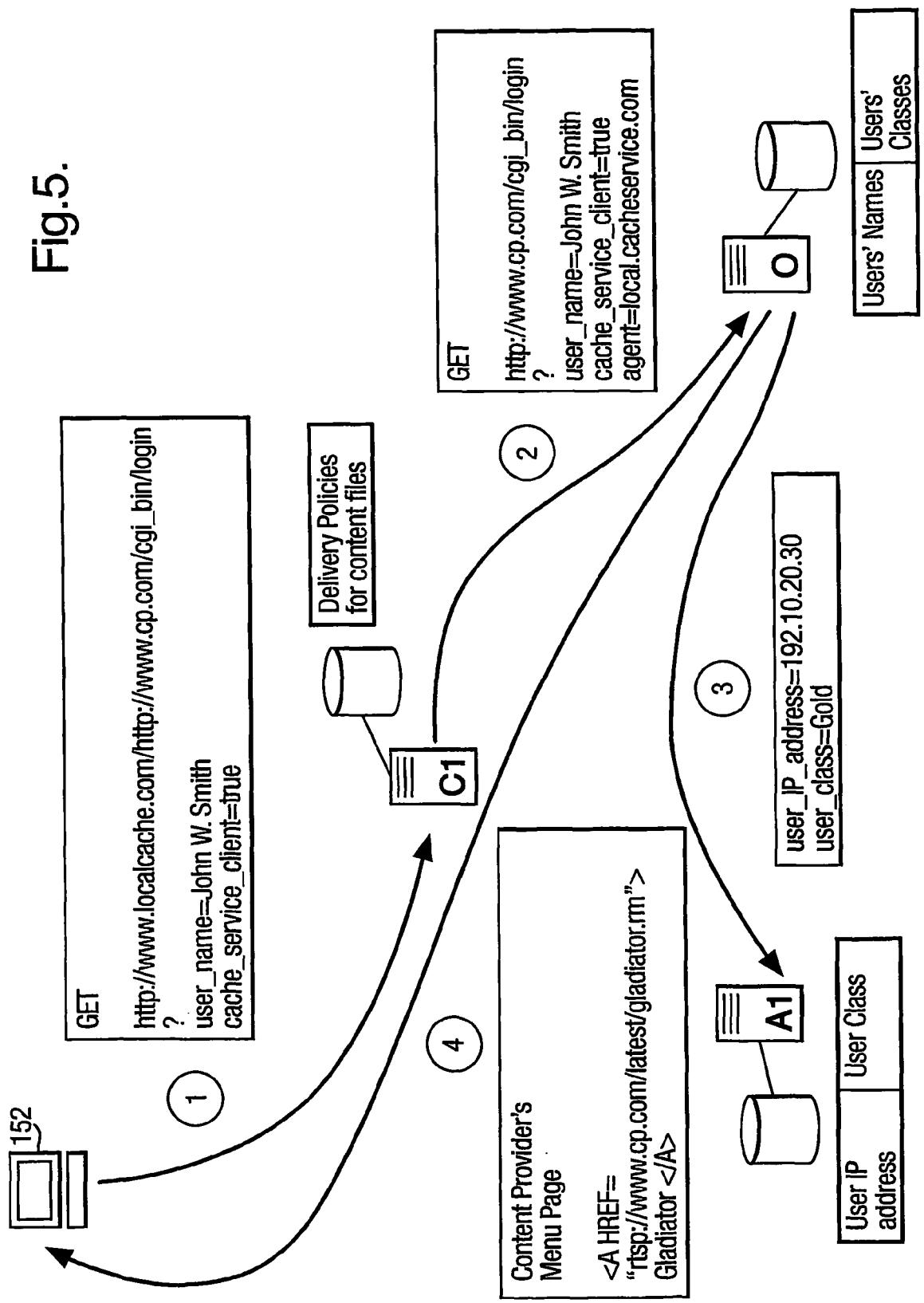
FIG. 5 shows the flow of messages between devices in a session initiation phase of the first embodiment.

FIG. 5 shows the steps involved when a previously registered user at PC 152 browses the home page of the content provider. The home page includes a form as provided for by HyperText Mark Up Languages HTML 2.0 and above. As will be understood by those skilled in the art, the form as presented to the user has text fields into which the user must enter his user name, and a submit button. The HTML file representing the web-page will also contain a URL which points to a Common Gateway Interface script (i.e. an executable program) and a further indication parameter not displayed to the user that indicates the web-page has been generated for a registered client of the caching server operator. When the user clicks on the submit button, the browser program running on the PC 152 sets up a Transmission Control Protocol (TCP) connection to the Layer 4 switch 148 and sends a HyperText Transfer Protocol (HTTP) GET request across that TCP connection (step 1). The layer 4 switch 148 is configured to redirect all requests destined for the default ports used for each content file type to the cache (e.g. port 80 for http and port 554 for rtsp). This avoids the browser program stored on the PC 152 having to be configured to point to the caching computer C1. The GET request is accompanied by the user name and the indication parameter. The Layer 4 switch 148 recognises the TCP port value in the GET request and hence forwards the request to the caching server C1. A plug-in program on the caching server C1 recognises that the request must be forwarded to the origin server O and, since the indication parameter is present (the indication being the indication cache_service_client=true which forms part of the Universal Resource Locator (URL) in the original GET request), appends an indication of the agent computer A1, appends the user's IP address and then sets up a further TCP connection to the origin Web server O and passes the modified GET message across that connection (step 2).

The origin Web server O receives the GET message and the appended user name, client indication, and agent identifier. In response, it runs the associated CGI script which causes it to:

a) fetch from the user database the user class, and then send that user class and an indication of the user's current Internet address to the agent computer A1 identified by the agent identifier in the received message (step 3); and b) send an HTML file representing a registered user menu page to the PC 152 (step 4). The HTML file includes one or more hyperlinks to content files previously copied to the caching server C1 by a content distributor as described above.

On receiving the user class message, the agent computer A1 stores the user class along with the user's current IP address.

Once it is received, the user's PC 152 presents the HTML file as a registered user menu page on the screen of the PC 152. The registered user menu page includes one or more hyperlinks which are associated with content files stored on the caching server C1.

Figure 6:
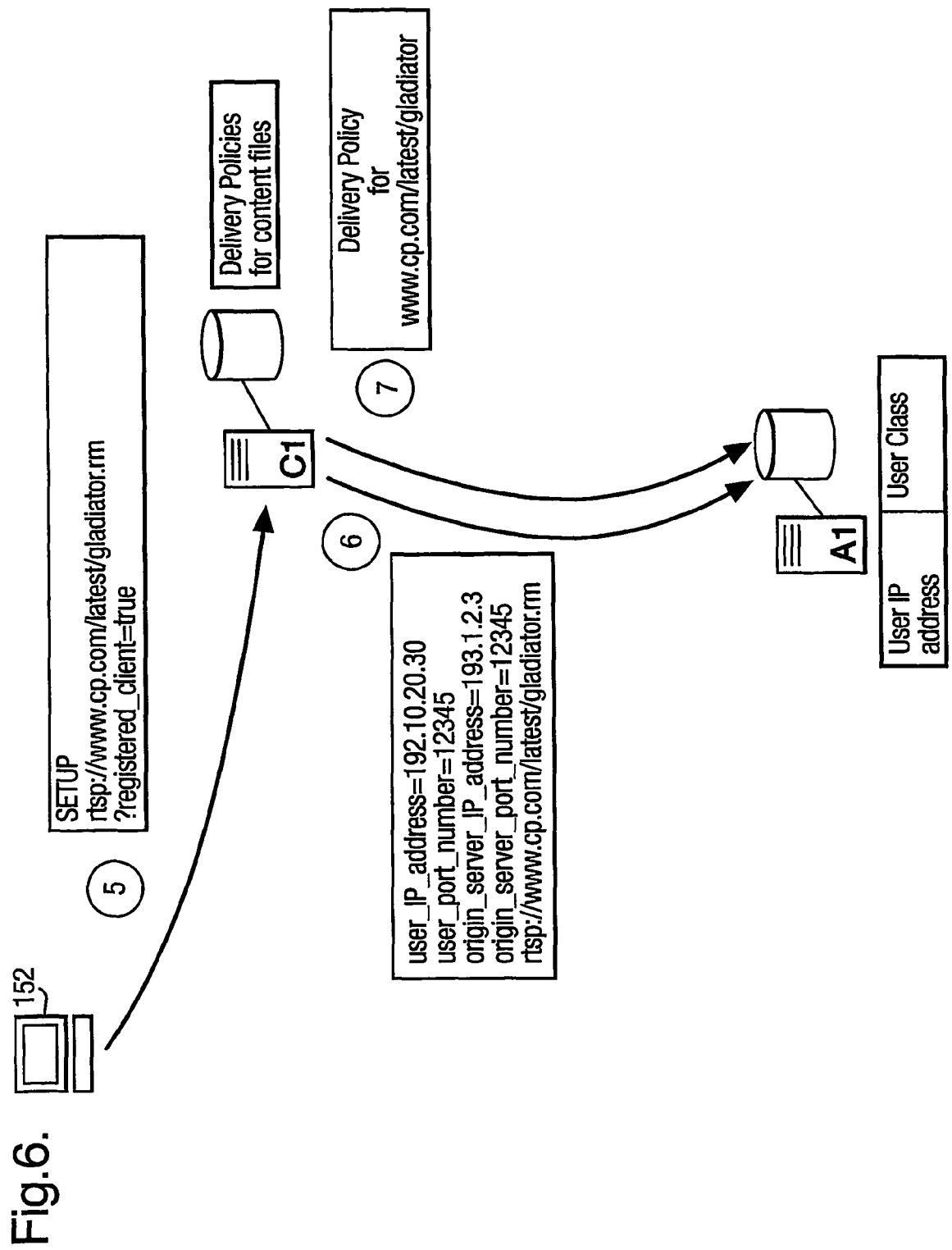
FIG. 6 shows the flow of messages between different devices of FIG. 1 in a first part of a content file request phase of the first embodiment.
Figure 8:
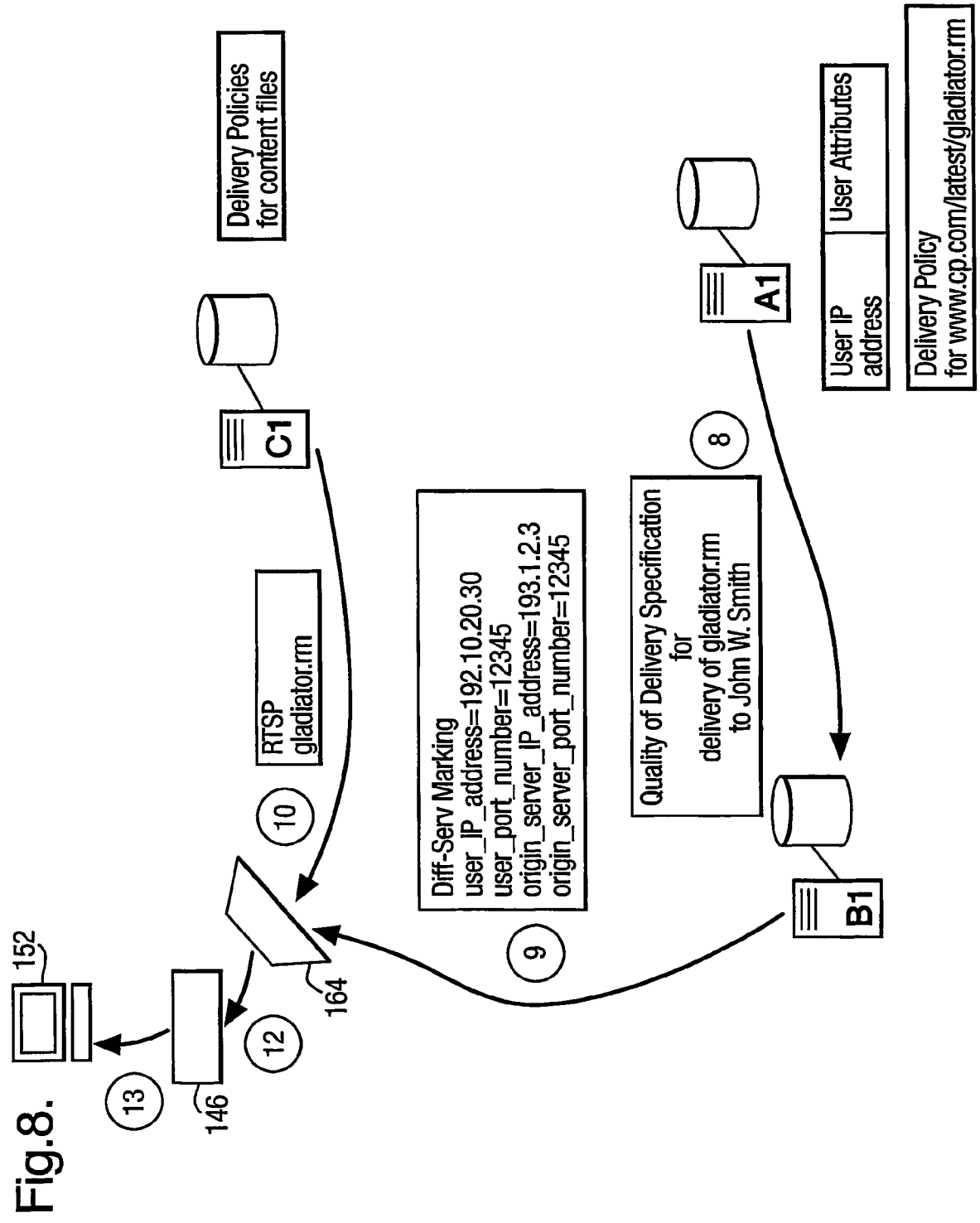
FIG. 8 shows the flow of messages between devices in a second part of a content file request phase of the first embodiment.

Turning now to FIG. 6, on the user selecting one of those hyperlinks, an RTSP SETUP request is sent to the Layer 4 switch 148. As before, the HTML file includes a HTML form which causes a further registered client indication to be included in the SETUP request. The Layer 4 switch 148 recognises the TCP port in the request and hence forwards the request to the caching server C1 (step 5). On receiving the SETUP request, the plug-in program at the caching server C1 responds to the presence of the further registered client indication by controlling the caching server C1 to send a content file transfer parameters message to the agent computer A1 which includes the URL of the requested content file, values of the user's TCP port and IP address, and the origin server's TCP port and IP address (step 6).

On receiving the content file transfer parameters message the agent computer A1 fetches the delivery policy (FIG. 4) associated with the content file identified in the content file transfer parameters message (step 7).

The agent computer A1 then looks up the stored user class (which it received in step 3) associated with the IP address received in the content file transfer parameters message (received in step 6).

The agent computer A1 then selects the set of class-specific quality of delivery parameters which corresponds to the stored user class from the delivery policy file received in step 7. The selected set is then incorporated in a quality of delivery specification for this specific User/Content-File combination (FIG. 7) which is forwarded (FIG. 8—step 8) to the bandwidth broking computer B1.

For variable-bandwidth service offerings, the amount of bandwidth available for a delivery of a content file will either stay the same, decrease or increase. However, the amount of bandwidth offered cannot decrease below zero. Equation 1 below is a probability density function which, for a variable-bandwidth service offering which offers bandwidth $b_i$ for a delivery at time t=0 can be integrated over a bandwidth range between a lower bandwidth and an upper bandwidth to give the probability of the bandwidth being in that bandwidth available for a delivery range after a given time period T.

$$p_n(b) = c \frac{b^2}{\sqrt{kT}} e^{-\frac{(b-b_i)^2}{kT}} \qquad \text{Equation 1}$$

C is chosen so that:

$$\int_0^\infty p_{n,T}(b)db = 1$$

The value k in the above expression is a volatility index which expresses the volatility in the amount of bandwidth the service offering supplies to a user—higher values of k represent greater volatility.

Figure 9:
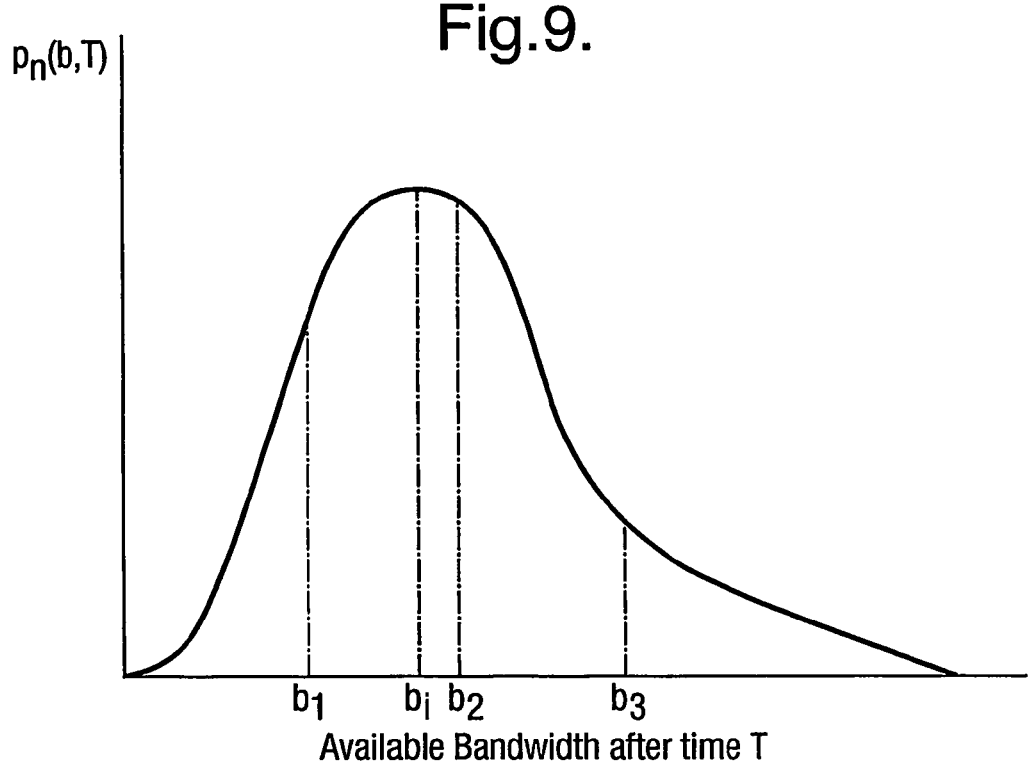
FIG. 9 illustrates a probability density function of the bandwidth available within a one of a plurality of variable-bandwidth service offering from the regional cable network at a time T after bandwidth $b_i$ was available for each user of that service.

FIG. 9 illustrates the form of the above probability density function which represents the likelihood of a bandwidth b being offered at a time T after an amount of bandwidth $b_i$ was offered. As will be understood by those skilled in the art, the area under the curve up until the line labelled bm represents the probability that less bandwidth than $b_m$ is available at time T. The 'width' of the peak of the distribution grows as the square root of time.

Figure 10:
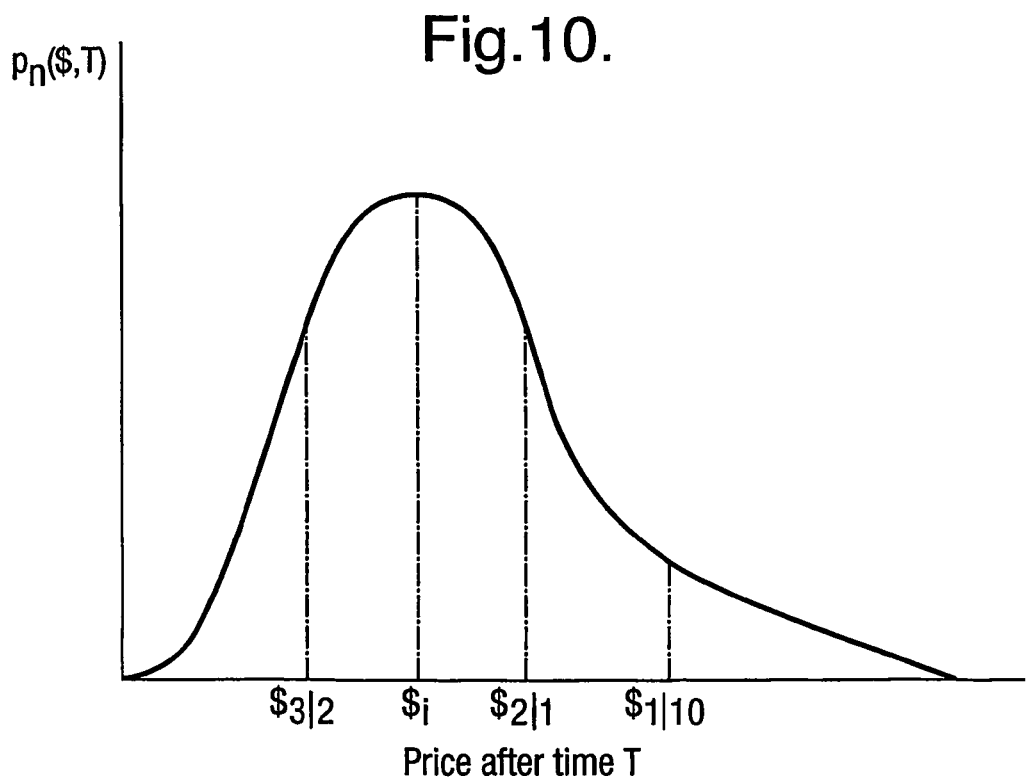
FIG. 10 illustrates a probability density function of the price requested for a dynamically-priced service offering from the DSL network operator at a time T after price $\$_i$ was requested.
Figure 12:
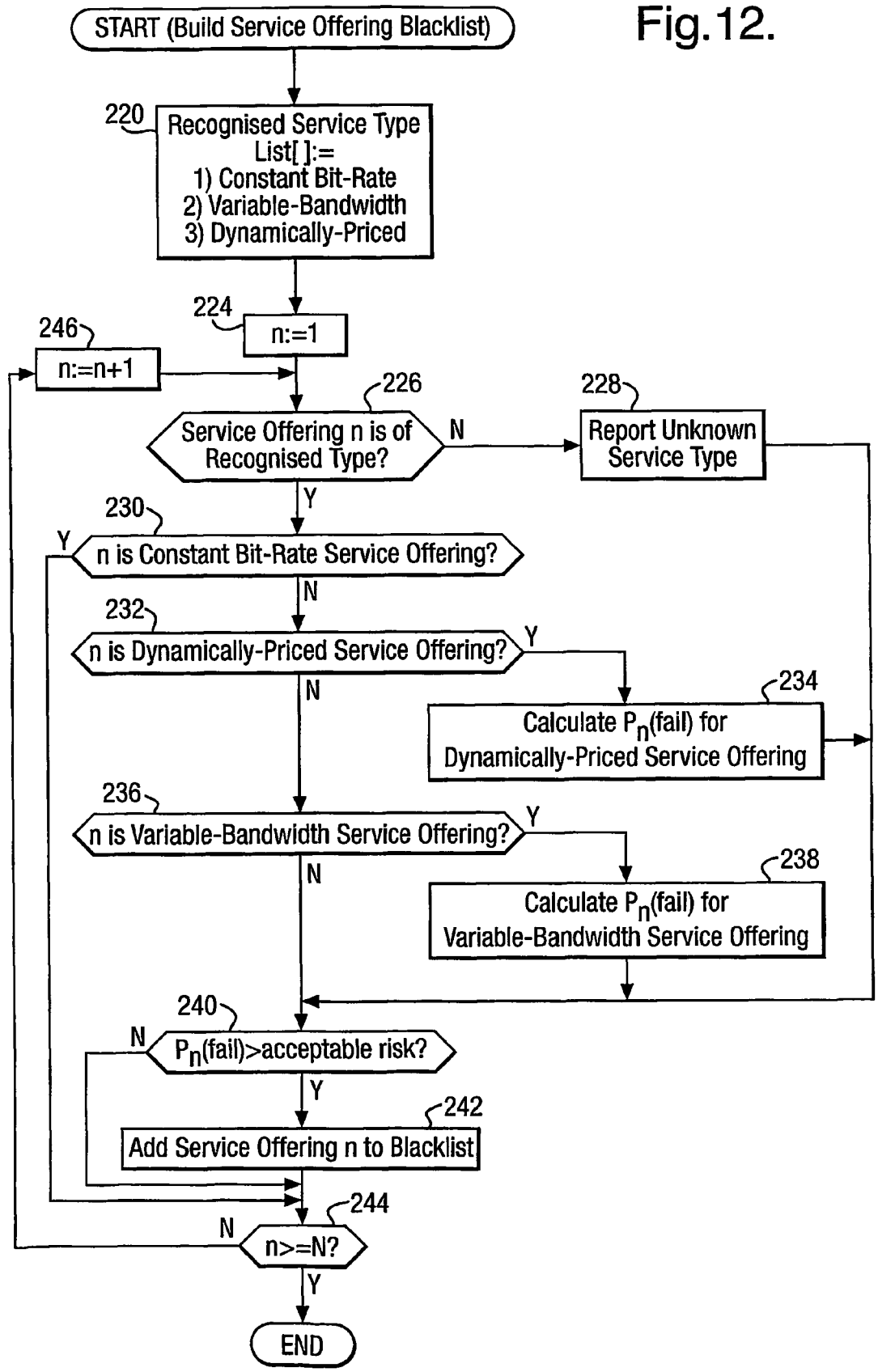
FIG. 12 shows a process for building a blacklist of service offerings unsuitable for the current content file delivery.

An analogous probability density function can be used to model the variation of price in a dynamically-priced service offering. FIG. 10 shows such a probability density function, including examples of so-called marginal prices at which the content provider (or other purchaser) would choose to move between services indicated in the quality of delivery policy (FIG. 4). $\$_{3|2}$ for example, represents the price below which the purchaser would choose the highest of three indicated services in preference to the other indicated services and just above which the purchaser would choose the second highest indicated service.

It is to be noted that FIG. 10 represents a simple situation. In FIG. 10, the lowest marginal price is that at which the indicated service obtained by the purchaser drops from the highest indicated service to the next highest indicated service. That behaviour is seen when the unit value of bandwidth decreases with increasing bandwidth—however, in some indications a purchaser may place an increasing value on a unit of bandwidth as bandwidth increases.

The bandwidth broking computer B1 stores network data (FIG. 11A) specific to the regional cable network. The network data indicates the different service offerings (first row) which are available in the cable network, and the bandwidth currently available to a user of each service offerings (fifth row), together with the price of bandwidth (fourth row) in each service. Also indicated is the type of each of the service offerings (third row). A service offering number is associated with each of the services (second row). Finally, the value of the volatility index to be used in obtaining the probability density function which describes the amount of bandwidth at a time T after bandwidth $b_i$ was available is given for each of the service offerings (sixth row).

In the present example, the data (FIG. 11A) indicate that the cable network offers a high-priority (Priority 1) service offering, a mid-priority (Priority 2) service type and a best-effort service type. All three services are variable-bandwidth services—the volatility of the services increasing in the above order.

In contrast, the network data (FIG. 11B) stored at the bandwidth broker computer B2 of the DSL network (FIG. 3) indicates that the DSL network offers two service offerings, the first being of the constant bit-rate type and the second being of the dynamically-priced type. As with the cable network, the price of bandwidth and the amount of bandwidth available to a user are given. Also given is the volatility of the price of the dynamically-priced service offering.

FIGS. 12 to 23 are flow charts illustrating the operation of a computer under the control of a 'generic' network service purchasing agent program—the program is 'generic' in the sense that it can select between constant bit-rate, variable bandwidth and dynamically-priced services. In the present embodiment, the program is executed by a network's bandwidth broker computer (B1 or B2) when that computer receives a quality of delivery specification from the local agent computer (A1 or A2). The program is stored in a storage medium, which is a particular form of a program storage device.

On receiving the quality of delivery specification (FIG. 7) for this content file/user combination (FIG. 8, step 8) the bandwidth broker computer generates a blacklist of those service offerings available from the network which do not meet the acceptable risk requirement as out in the quality of delivery specification.

The generation of the blacklist (FIG. 12) begins with the setting out of the list of known network service types (step 220).

The process then enters a loop of instructions (step 224 to step 246), each iteration of that loop involving the carrying out of a service offering evaluation process.

The service offering valuation process begins with a check to find whether the nth service offering by the network is of a recognised type (step 226). If it is not included in the service type list generated in step 220 then the bandwidth broker computer (B1 or B2) reports the presence of an unknown service type (step 228). If the service type is recognised then a test (step 230) is carried out to find whether the service is of a constant bit rate type. If it is, then the process proceeds to the next iteration of the loop (if any). If the nth service is not of a constant bit rate service type then a further test is carried out to find whether it is a dynamically-priced service offering (step 232). If it is a dynamically-priced service offering then a process (step 234) is followed to calculate the probability of the delivery of the content file ceasing prematurely. If the nth service offering is not dynamically priced then a test is carried out (step 236) to find whether the service offering is a variable bandwidth service offering. If the service offering is a variable bandwidth service offering then a process (step 238) is carried out to find the probability of the delivery of the content file ceasing prematurely if that service offering were to be used in delivering the content file.

Once the probability of premature cessation of delivery has been found, a test (step 240) is carried out to find whether that probability is greater than the acceptable risk set out in the quality of delivery specification received from the agent computer. If the risk is higher than the maximum acceptable risk then the nth service offering is added to a blacklist of services which present a greater risk of premature delivery cessation than the purchaser is prepared to countenance (step 242). If the risk is less then the maximum acceptable risk then the next iteration of the loop (if any) is carried out.

Figure 13A:
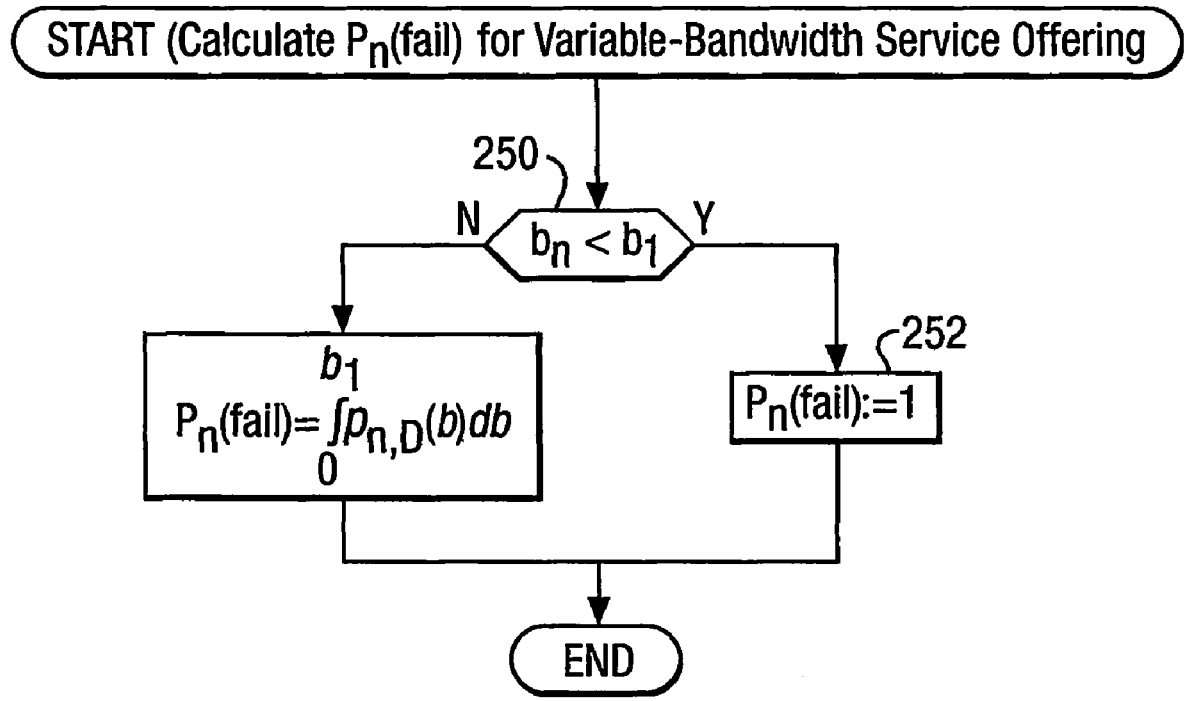
FIGS. 13A and 13B show processes for calculating, at the start of the delivery, the probability of a premature delivery cessation for variable-bandwidth and dynamically-priced services respectively.

The process for calculation the probability of premature cessation of delivery when a variable bandwidth offering service is used will now be described in more detail with reference to FIG. 13A. The process begins with a check (step 250) to find whether the level of bandwidth currently available ($b_n$) from this (nth) service offering for a delivery is less than the lowest non zero indicated service in the quality of delivery specification (FIG. 7). If the currently available amount of bandwidth for the delivery is less than the lowest non zero indicated service then the probability of the delivery ceasing prematurely is set to one (step 252). If, on the other hand, the amount of bandwidth currently available for a delivery is greater than the lowest non zero indicated service then a calculation of the probability of premature cessation of the delivery is made (step 253). That calculation begins with the setting of the value k in the probability distribution function given above to the value found in the network data (FIGS. 11A and 11B) and the setting of the parameter T in the function to the duration D of the delivery as given in the quality of delivery specification. The multiplying factor C is then calculated to ensure that the integral of the function over the all possible values of available bandwidth is equal to one. Having substituted the multiplication factor C, the volatility k, and the duration D into the probability density function given above, the resulting function is integrated between a bandwidth of zero and the lowest non zero indicated service in the quality of delivery specification to find the probability of premature delivery cessation. Once the probability of premature delivery cessation has been found then the process (FIG. 13A) ends.

As mentioned above, when provided with a dynamically-priced service, a rising price will cause the rate at which the user accumulates surplus (where surplus accumulation rate=utility accumulation rate–price of reserved bandwidth) to drop. Normally, the utility accumulation rate per unit of bandwidth drops as the amount of bandwidth provided to the purchaser increases (so the seller of the bandwidth sees diminishing returns with rising bandwidth). Since the allocation of bandwidth is made for a predetermined period, the surplus gained per predetermined period from operating at the higher indicated bandwidths also drops as bandwidth rises (for a given price per unit time per unit bandwidth). Hence, where allocation is made on the basis of allocating a purchaser the service which offers the highest surplus for the next predetermined period and the seller sees diminishing returns with increasing bandwidth, the amount of bandwidth reserved for the purchaser will fall from the highest indicated bandwidth and then through each lower indicated bandwidth in turn as the price of bandwidth rises.

But, in some circumstances, a seller would see increasing returns as the amount of bandwidth supplied to a purchaser rises. For example, if the highest indicated bandwidth represents the highest unit value of bandwidth to the purchaser, then the highest surplus will be obtained from receiving the highest level of indicated bandwidth until the price rises above the unit value of bandwidth at that highest level, at which point the other indicated bandwidths will offer a negative surplus. Hence, where allocation is made on the basis of allocating a purchaser the service which offers the highest surplus and the seller sees increasing returns with rising bandwidths, the bandwidth reserved for the purchaser will fall in one step from the highest level of bandwidth to nothing in one step as the price of bandwidth rises.

When determining the probability of a delivery made using a variable-bandwidth service ceasing prematurely, it is necessary first to establish the indicated service which can return a positive surplus at higher prices than any other indicated service (since it is cessation of this indicated service that will cause cessation of the delivery as a whole).

Figure 13B:
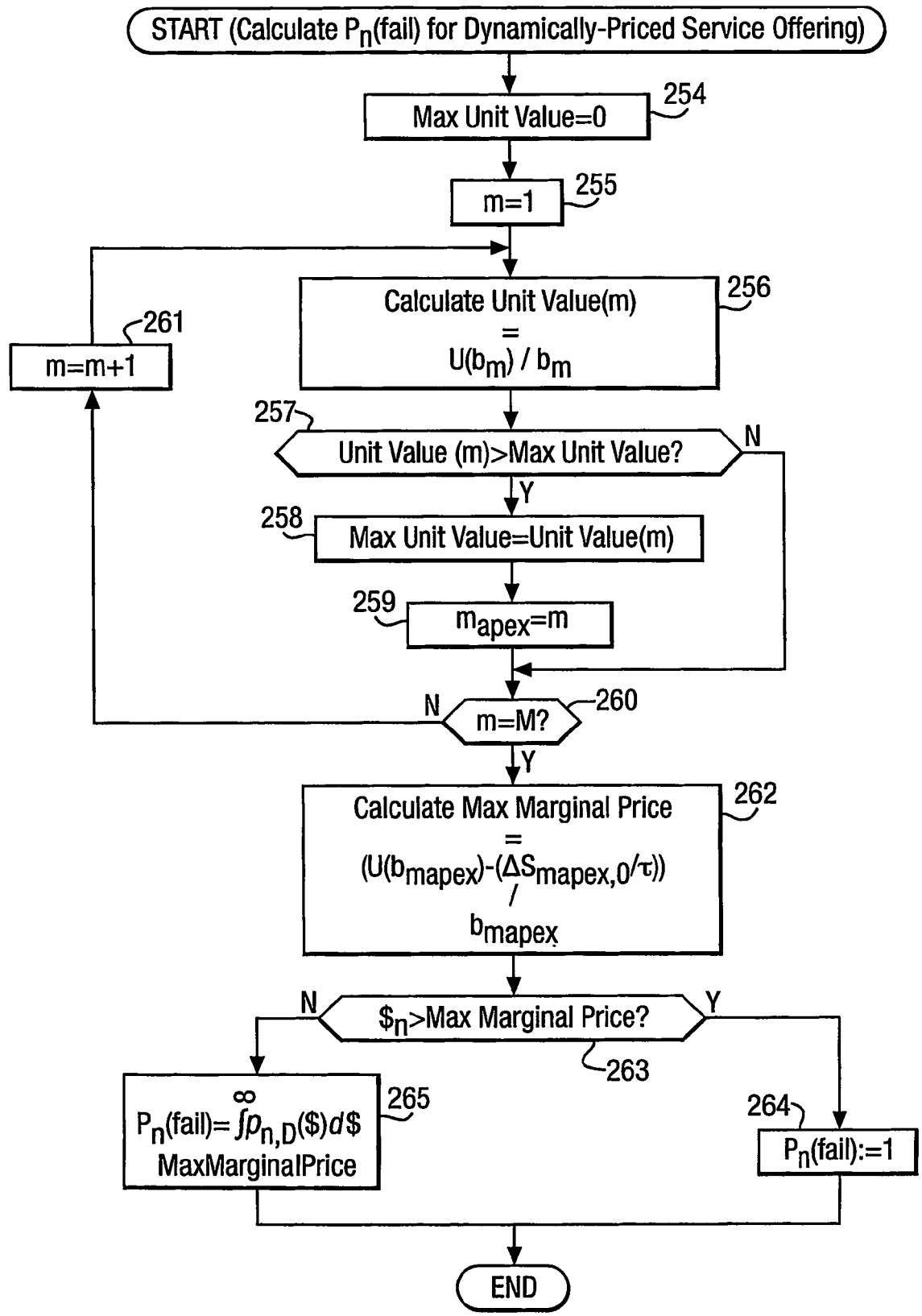
Figure 14:
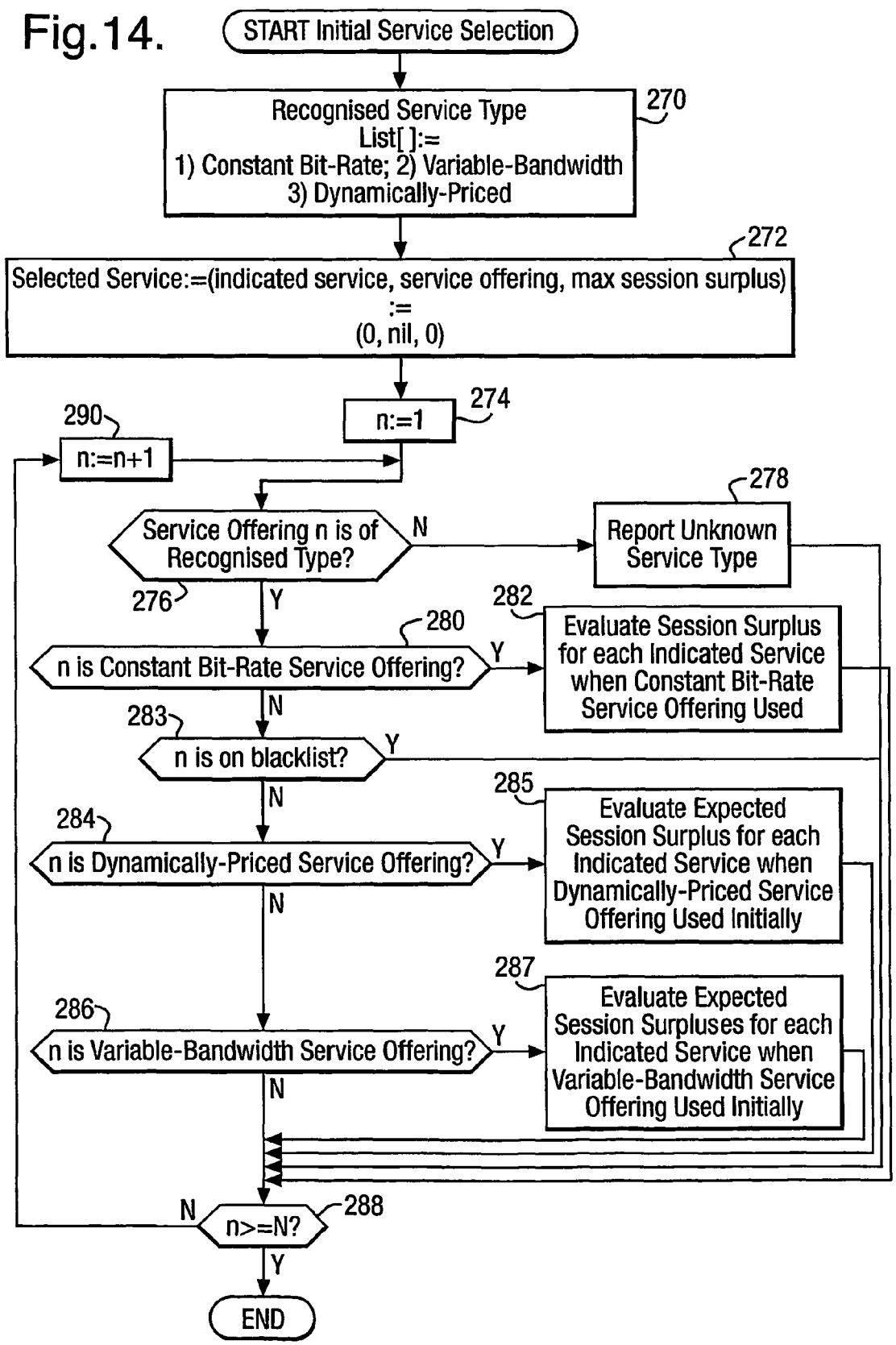
FIG. 14 shows an initial service selection process carried out by the bandwidth roker computer at the start of the delivery of a content file.
Figure 15:
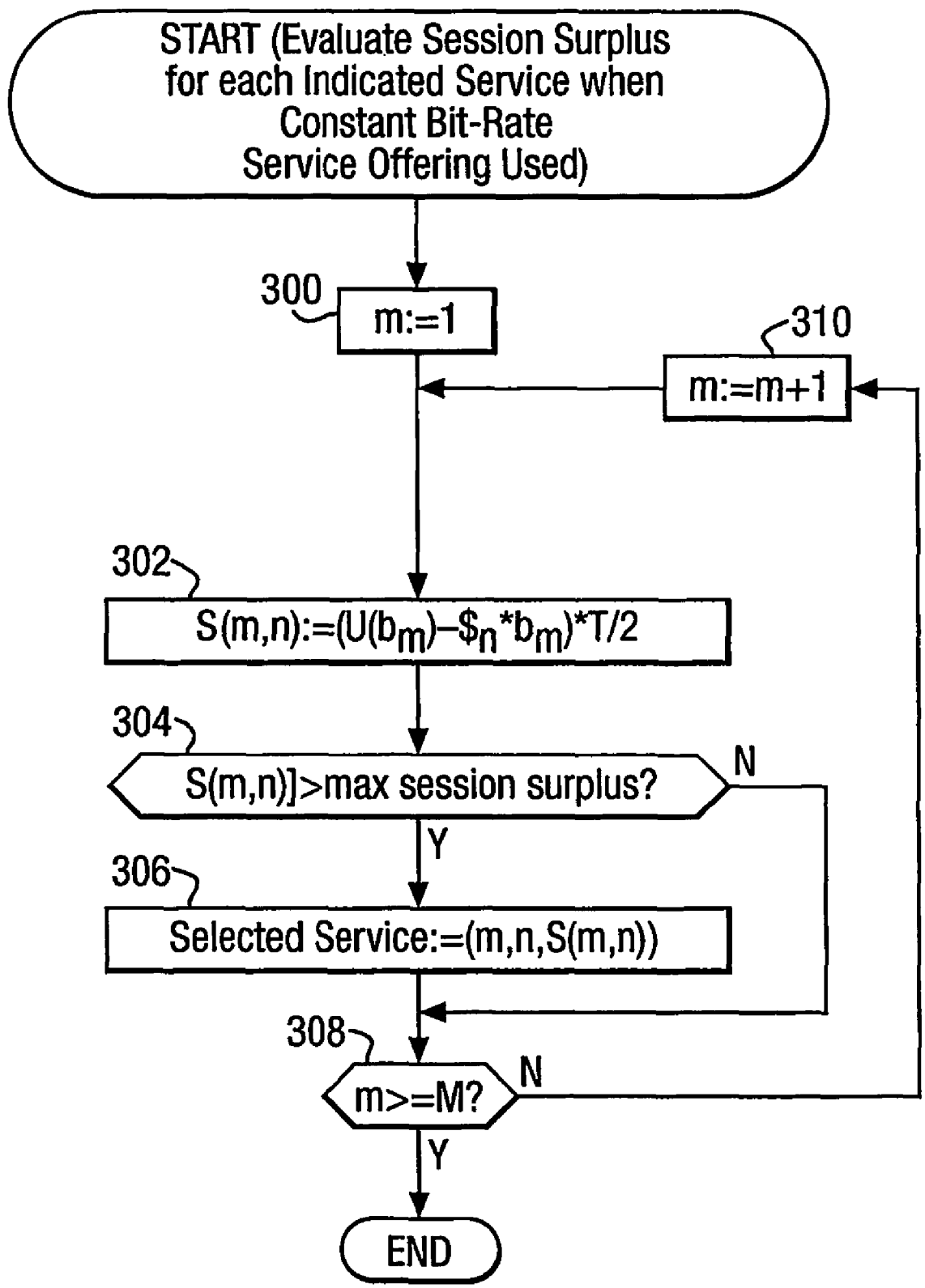
FIG. 15 shows a process for calculating the session surplus for each indicated service when a constant bit-rate service offering is used to deliver a content file.
Figure 16:
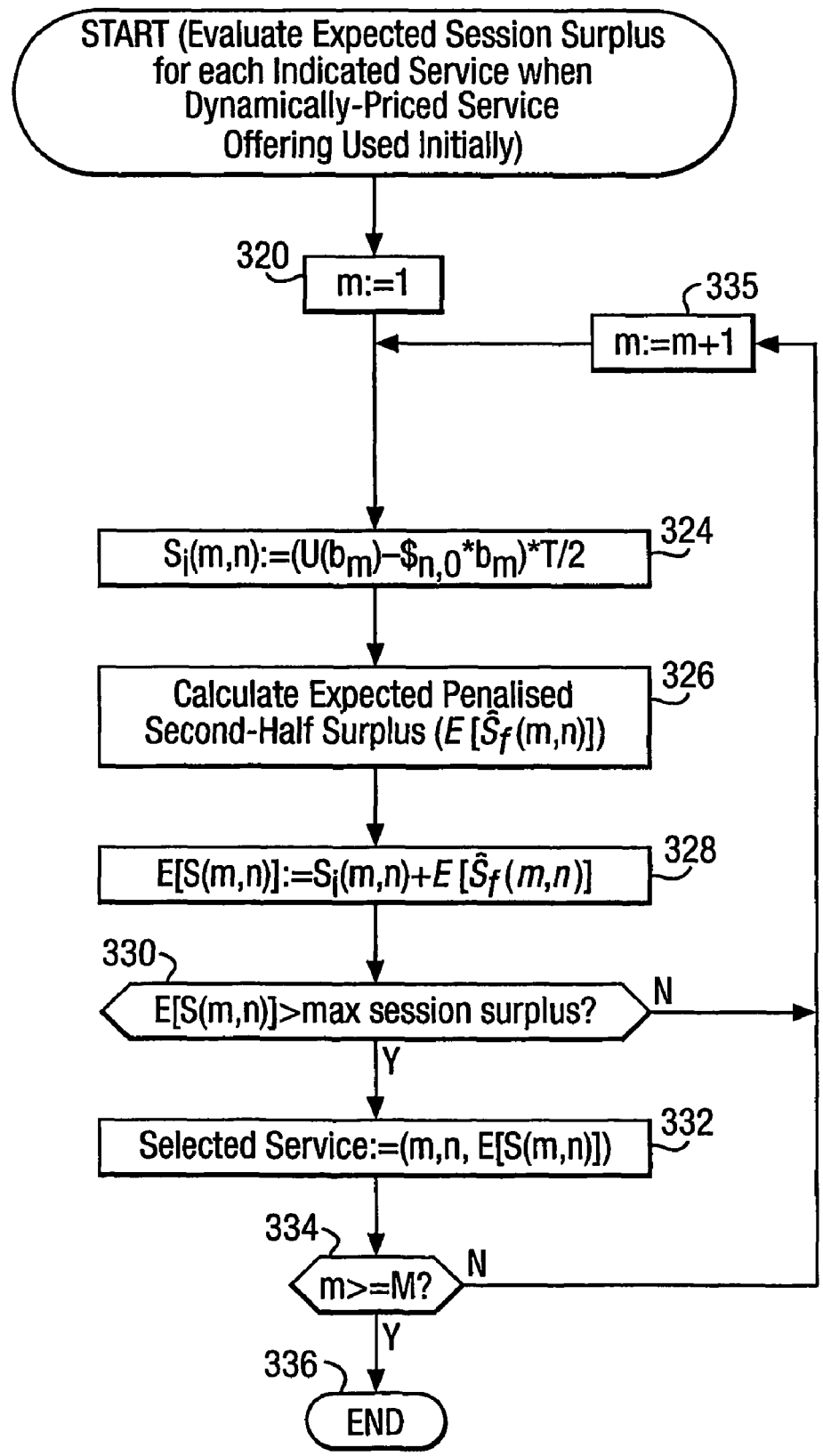
FIG. 16 shows a process for evaluating the session surplus for each indicated service when a dynamically-priced service offering is used to deliver a content file.
Figure 17:
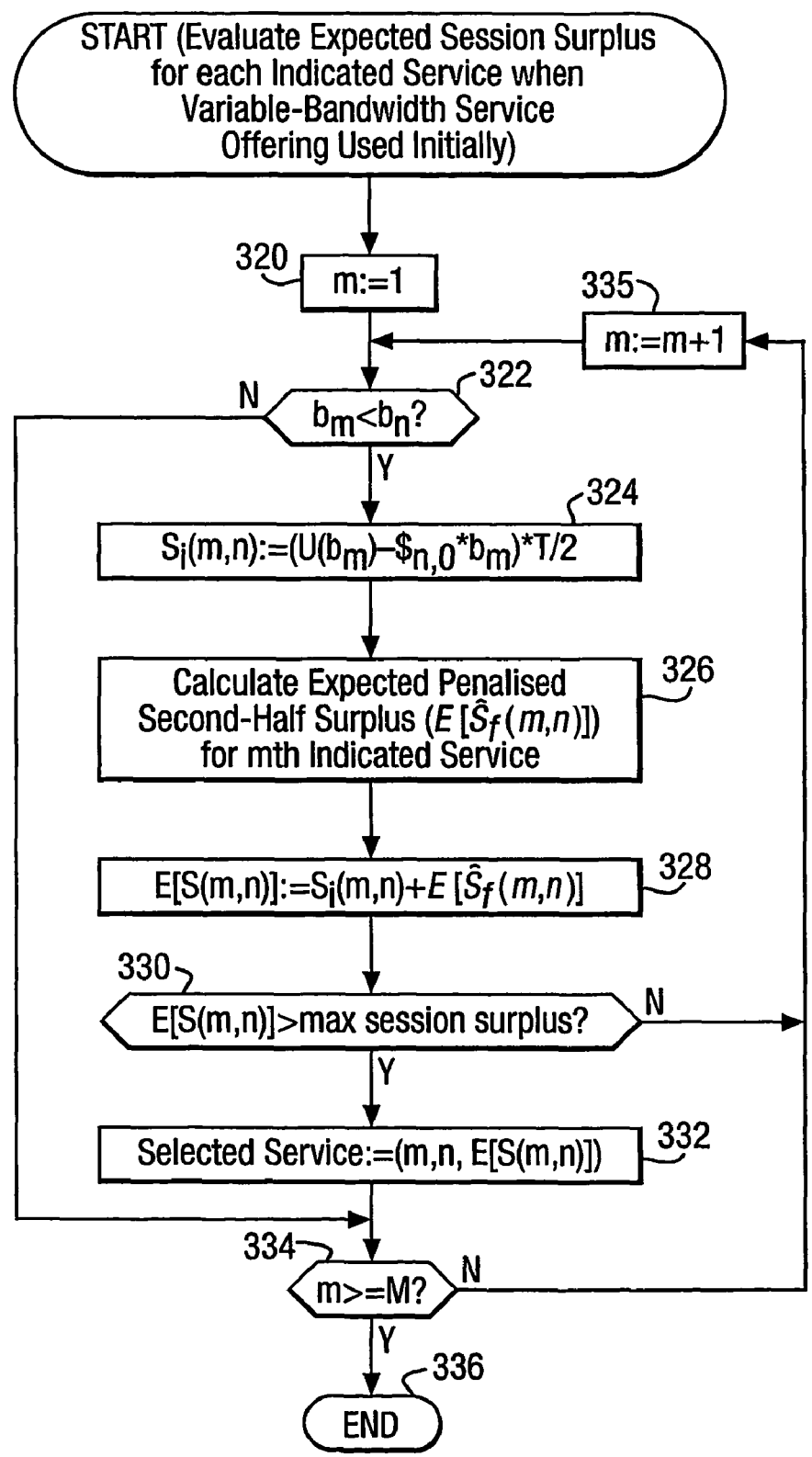
FIG. 17 shows a process for evaluating the session surplus for each indicated service when a variable-bandwidth service offering is used to deliver a content file.

The process for calculating the probability of premature delivery cessation carried out by the bandwith-broking computer will now be explained with reference to FIG. 13B.

The calculation of the risk of premature delivery cessation begins with the setting of a maximum unit value to zero (step 254). This is followed by the setting of an indicated service counter to one (step 255). Once this has been done, a loop is entered which is iterated as many times as there are non-zero indicated services (in the present case there are three levels—the zero indicated service is referred to herein as m=0, the next highest m=1 and so on to m=3). In each iteration of the loop a set of maximum unit value discovery instructions is carried out (step 256 to step 259).

The maximum unit value discovery instructions begin with the calculation of the unit value associated with the mth level of indicated service (step 256). Once this has been done, a test (step 257) is carried out to find whether that unit value is greater than the maximum unit value so far discovered. If the value is not greater than the maximum unit value yet discovered then the next iteration of the loop is carried out. However, if that value is greater than the maximum unit value yet discovered, the maximum unit value is updated to equal the unit value just calculated (step 258) and a variable $m_{apex}$ is set to the current value of m (step 259). Once the above loop of instructions has been carried out as many times as there are indicated services the maximum marginal price is calculated (step 262). The maximum marginal price is the price above which the current delivery will not receive any bandwidth from the dynamically-priced service offering. This price is calculated as for a conventional marginal price (that being the price at which the unit cost exceeds the maximum unit value to the purchaser) but is here adjusted to take account of the fact that a purchaser will be prepared to pay a premium to continue the delivery as the delivery nears its end.

The adjusted maximum marginal price is therefore calculated as $(U(bm_{apex})-(\Delta Sm_{apex}.0/\tau))/bm_{apex}$, where $\tau$ is the time-period for which the dynamically-priced service offers reservations and $\Delta Sm_{apex}$ is the penalty associated with the amount of bandwidth provided to the delivery moving from the indicated service which offers the highest unit value to zero bandwidth. This penalty is found in the quality of delivery specification (FIG. 7). It will be understood that the adjustment to the maximum marginal price is that which would occur in the very last reservation period of duration $\tau$ required to complete the delivery of the content file.

Having calculated the maximum marginal price i.e. the price at which the delivery would cease, a test (step 263) is carried out to find whether the current price of bandwidth in the dynamically priced service offering being investigated is greater. If it is greater the delivery will necessarily fail and the probability of premature cessation is set to one (step 264). If, on the other hand, the current price is less than the calculated maximum marginal price then a calculation of the probability premature delivery cessation is made (step 265). The calculation begins with the substitution of the volatility index k, the duration of the content file D into the probability density distribution given in equation 1 above (but with the random variable being price instead of bandwidth). k and D are obtained from the network data (FIG. 11B) and quality of delivery specification (FIG. 7) respectively. Having substituted those values, the value of C which causes the integral of the probability density function over all possible prices to equal one is calculated. Once that has been calculated, the resulting function is integrated from the maximum marginal price calculated in step 262 up to infinity. The result of that integration is the probability of the delivery ceasing prematurely if this dynamically-priced service offering is used.

Once the probability of premature cessation has been calculated in this way the process ends.

It is to be understood that the blacklist created by the process described above in relation to FIGS. 12 and 13 might be followed by a random selection of service from the services which are not blacklisted. This would, by itself, represent an improvement of the known methods of service selection.

However, in the present embodiment, the bandwidth broker computer further refines its selection of which service to use for a communication. This is done by predicting, for each service which is not blacklisted, the surplus that is likely to be accrued over the duration of the communication. The process will be described below with reference to FIGS. 14 to 22.

The process for selecting the service to be used at the start of the delivery (FIG. 14) is similar to the process for blacklisting certain services in its top level structure. As with the process for creating the blacklist, a loop of instructions (step 274 to step 290) is followed which considers each service offering in turn, but rather than calculating the probability of premature delivery cessation if that service should be selected, the session surplus that is likely to be accrued over the duration of the delivery is calculated instead.

In step 272, a selected service array variable is initialised. This array variable has three fields corresponding to an indicated service number (m), the number of the service offering being considered in the current iteration of the loop (this number being the service offering number given in the network data (FIGS. 11A and 11B)), and a maximum session surplus variable. These variables are initialised to values zero, nil, and zero respectively.

The service selection process (FIGS. 14 to 23) calculates the expected session surplus gained when taking each indicated service from each service offering and updates the selected service array variable when a service (i.e. a given indicated service from a given service offering) is found which offers a session surplus which is greater than the highest session surplus for all the services which have previously been considered. At that time the number of the service offering and the number of the indicated service stored in the selected service array variable are updated to reflect the values associated with the newly favoured service. Hence at the end of the process shown in FIG. 14 the selected service array variable contains an indication of the service to be used at the start of the delivery together with an indication of the session surplus that is likely to be accrued from the use of that service to make the delivery.

On each iteration of the loop of instructions (steps 276 to step 290), a test (step 283) is carried out to find whether the service offering currently being considered is on the blacklist created in accordance with the process described above. If the service is on that blacklist then the current iteration ends and the next service offering (if any) is considered. In this way, it is ensured that the service represented in the selected service array variable at the end of the initial service selection process (FIG. 14) will not be a service provided by a blacklisted service offering.

If, the test (step 280) to find whether the service offering currently being considered is a constant bit rate service offering is positive then a calculation of the session surplus to be expected from each indicated service when taken from a constant bit-rate service offering over the duration of the delivery is calculated in step 282. This calculation will now be explained in more detail with reference to FIG. 15.

The calculation of session surplus for a constant bit rate service offering is carried out for each of the indicated services in the quality of delivery specification in turn. In this process, the rate of surplus accumulation (which equals the rate of utility accumulation minus the rate of expenditure) is multiplied by the duration of the content file as given in the quality of delivery specification (step 302). A test is then carried out to find whether the session surplus calculated is greater than the maximum session surplus so far found (step 304). If the session surplus is the greatest so far found then the selected service array variable is updated accordingly (step 306). If, on the other hand, the session surplus is less than that found for a previously considered service then a further iteration of the loop is carried out for each of the remaining as yet unconsidered indicated services.

In order to provide a measure of the session surplus obtained when a variable-bandwidth service or dynamically-priced service it is supposed that:
i) the network will continue to provide the initially selected service for the first half of the delivery;
ii) at the mid-point of the duration of the delivery, an opportunity to select a service for the second half of the delivery will be given; and
iii) once the service selection has been made, the network will continue to provide that service for the second half of the delivery.

It is to be noted that, if the proposed change of service at the mid-way point of the delivery was supposed to be made on the basis of the same criteria as the initial service selection, then the proposed service selection would have to calculate probabilities of service changes that might take place three quarters of the way through the delivery and those probabilities would in turn depend on probabilities of various service changes seven eights of the way through the delivery and so on. In the present embodiment the inventors have overcome this problem by assuming that the mid-way point service selection will be made on different criteria—the criteria used is that the service which maximises the instantaneous surplus accumulation rate at that time will be chosen (a penalty is also taken into account here—this is explained below). Furthermore, it is assumed that the service will be maintained throughout the second half of the session—so an equivalent assumption is that the service which maximises the penalised second half surplus will be chosen.

As mentioned above, the penalised surplus is considered rather than the surplus itself. The penalised surplus is a surplus value which includes a utility penalty if the indicated service chosen for the second half differs from that chosen for the first half.

That expected penalised second half surplus is found by assuming that the indicated service which maximises the penalised second half surplus will be chosen for the second half of the delivery. The problem then is that the surplus for the different services cannot be found directly since the price of a dynamically-priced service offering or the bandwidth available from a variable-bandwidth service offering at the mid-way point cannot be known at the start of the delivery.

In the present embodiment, the inventors have overcome that problem by calculating for any variable bandwidth offering, the ranges of available bandwidth which would lead to a given service providing the maximum penalised second half surplus (i.e. which would lead to that service being selected for the second-half). The probability of the bandwidth then being in that range can be found from the above probability density function. By summing the products of the probability of getting a given surplus and the amount of that surplus, an expected second half surplus for the variable-bandwidth service offering is obtained.

A similar calculation is made for the dynamically-priced service offerings. It is further assumed that the service offering chosen for the second half will be that which offers the greatest expected penalised second half surplus. It is that greatest expected penalised second half surplus which is used in the calculation of expected session surplus for each of the non-blacklisted candidate first half services.

Also, note that if no service offerings are blacklisted then, in the case of the cable network, there are 3*3=9 possible services for the first half (the product of the number of service offerings and the number of indicated services). Each of those requires the 9 possible services for the second half to be considered. This represents a similar amount of processing to comparing 81 service combinations.

If, instead of assuming a single change of service point at the half-way point, the session surplus was predicted by a series of service change points at 30 second intervals, then the number of possible combinations of services used in a delivery lasting for a number (P, say) of 30 second reservation periods would be $81^P$. For most deliveries this leads to an astronomical number of combinations to be considered—hence the problem of predicting the session surplus might be thought intractable. The problem increases in the case of variable bandwidth services where the bandwidth supplied to a delivery may vary in a time period of a similar length to the time taken to send a packet at the transmission rate of the link that leads from the store where the packet is held.

The calculation of the expected session surplus where a dynamically-priced service offering is used (FIG. 16—which corresponds to step 285 in FIG. 14) carries out 10 a loop of instructions (steps 324 to 335) for each of the indicated services in the quality of delivery specification (FIG. 7). The loop of instructions (steps 324 to 335) begins with the calculation of the surplus which results from the mth indicated service being provided to the purchaser for the first half of the delivery (step 324). Note that $\$_{n,0}$ refers to the price of bandwidth in the nth service offering at the start of the delivery. Note that the subscript i in the expression $S_i(m,n)$ indicates that the surplus calculated in step 324 relates to the initial half of the delivery. Once the surplus for the first half of the delivery has been found, a calculation (step 326) is carried out to find the expected penalised second half surplus that will be obtained in the second half of the delivery. Note that the caret above the 'S' indicates penalisation. Penalisation will be explained in more detail below with reference to FIG. 18.

Once the surpluses for the first half and second half have been found, the two are added together to give the expected session surplus if the mth indicated service is taken from the nth service offering. Once this sum has been calculated, it is compared to the maximum session surplus found so far (step 330). If the expected session surplus is greater than the maximum session surplus so far found then the selected service array variable is updated with the service (m,n) currently being considered, and the associated expected session surplus (step 332). The loop of instructions is then repeated for any indicated services that have not yet been considered. Once all the indicated services have been considered then the consideration of the dynamically-priced service offering currently being considered ends (step 336).

Where the initially selected service offering is a variable bandwidth service offering then the process for calculating the expected session surplus (FIG. 17) performed by the bandwidth broker computer (FIG. 16B) is identical to the process for calculating the expected session surplus where a dynamically-priced service offering is being considered save for one extra processing step. This extra processing step is the introduction of a test (step 332) at the start of each iteration of the loop of instructions which finds whether the currently selected variable bandwidth service offering is offering sufficient bandwidth to support the indicated service being considered in the current iteration of the loop of instructions (steps 322 to 335). If the service offering would not be able to provide a service with a level of bandwidth as great as that needed for the currently indicated service then the possibility of using that service is in effect discounted by jumping to the next iteration of the loop of instructions (steps 322 to 335).

The calculation of expected penalised second half surplus performed by the bandwidth broker computer (as part of the calculation of expected session surplus (step 328 in FIGS. 16 and 17)) will now be explained with reference to FIGS. 18 to 23.

Figure 18:
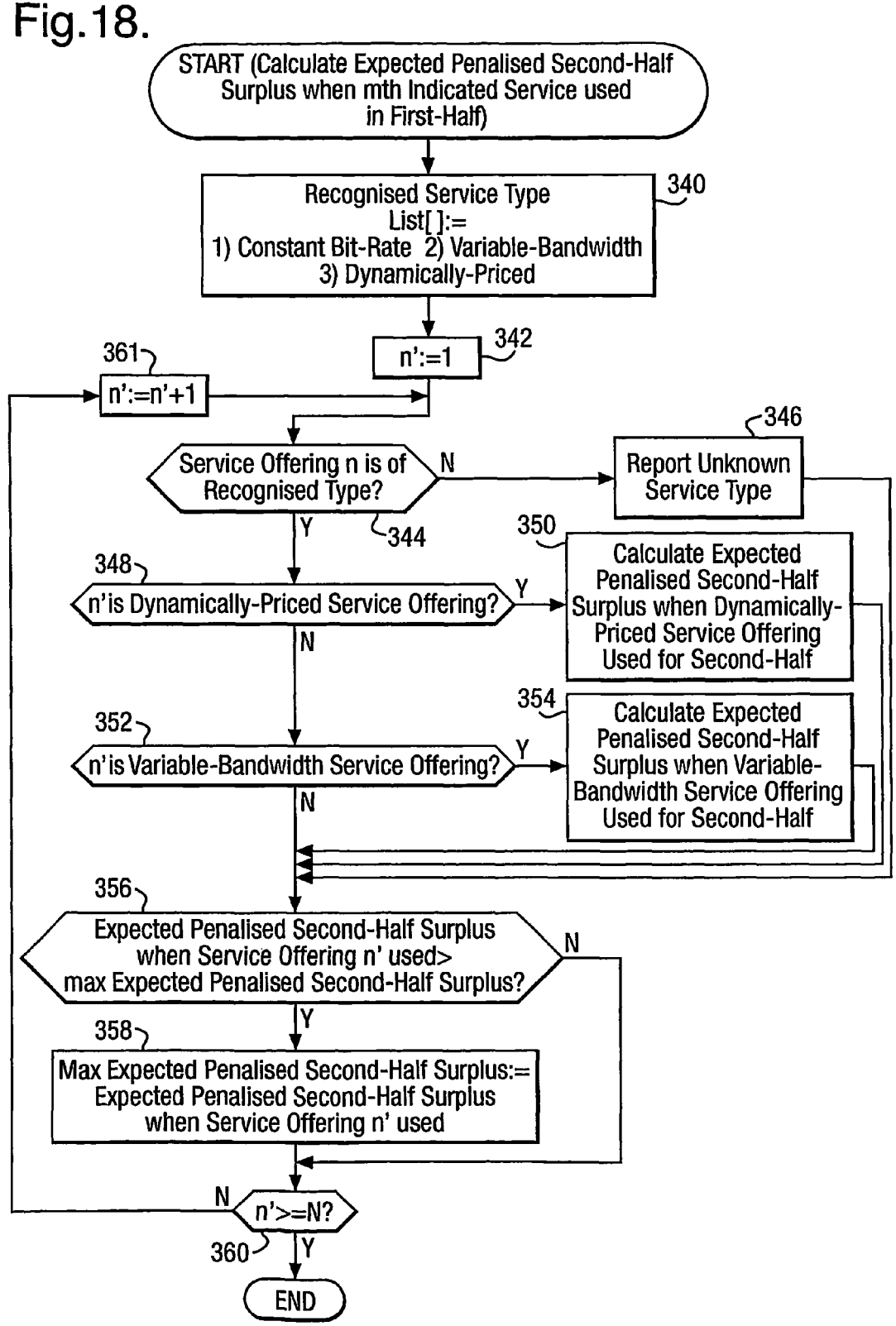
FIG. 18 shows the calculation of expected penalised second-half session surplus used when considering using a variable-bandwidth service offering or a dynamically-priced service offering for the first half of a content file delivery.

At the top level the calculation of expected penalised second half surplus consists of the steps shown in FIG. 18. Note that m' and n' in the Figures refer respectively to the indicated service and service offering chosen for the second half of the delivery. It will be seen that the process comprises the repeated iteration of a loop of instructions (steps 344 to 361), once for each of the service offerings which might be used to provide service for the delivery during the second half of that delivery. The consideration of each service offering involves the consideration of each indicated service when provided by that service offering. The loop of instructions comprises a first part in which the expected penalised second half surplus is calculated for the service offering currently being considered (steps 344 to 354), and a second half (steps 356 and 358) in which the maximum of the expected penalised second half surpluses calculated so far is found.

Figure 19A:
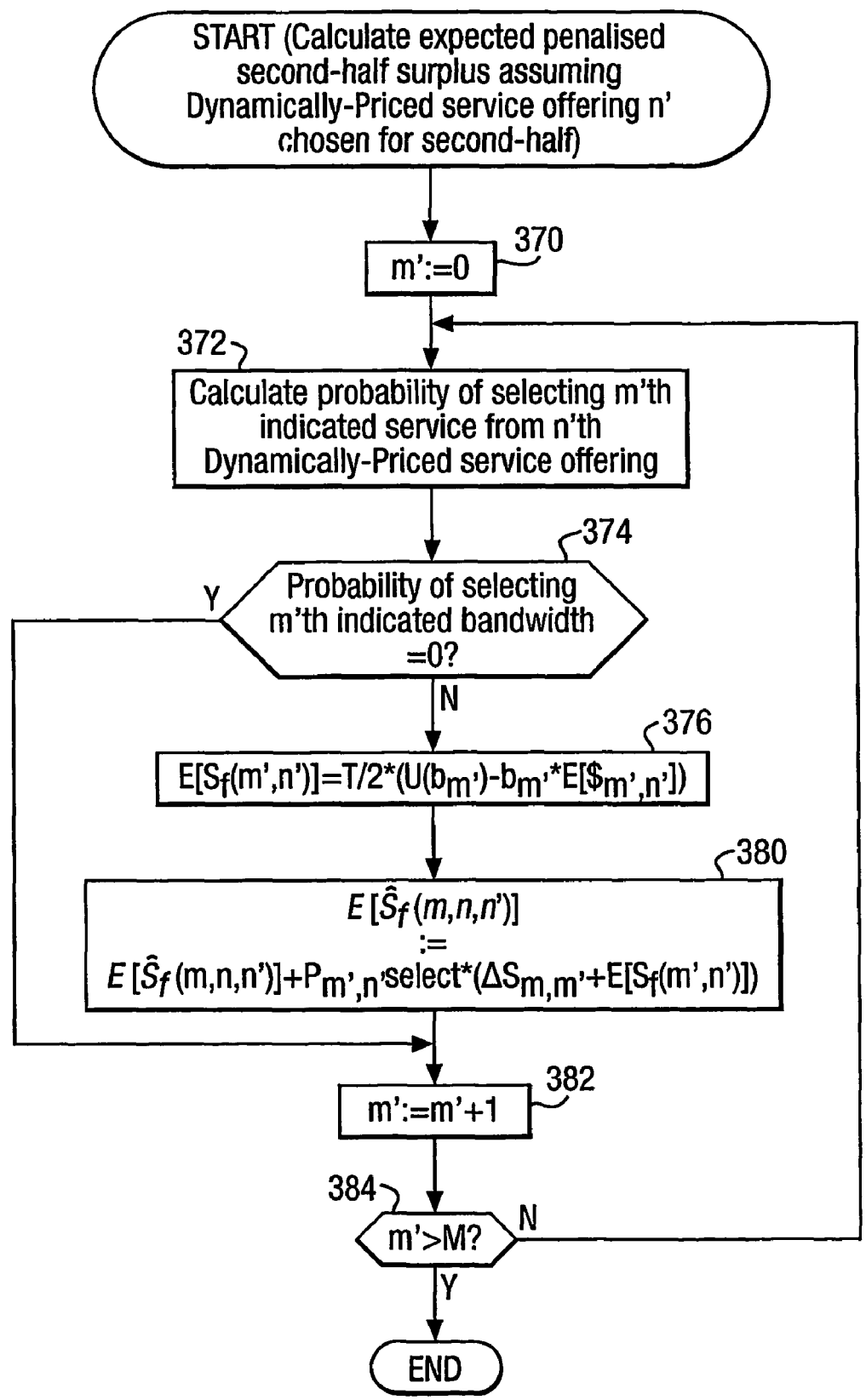
FIG. 19A shows the calculation of expected penalised second-half session surplus where a dynamically-priced service offering is used for the second half of a content file delivery.
Figure 19B:
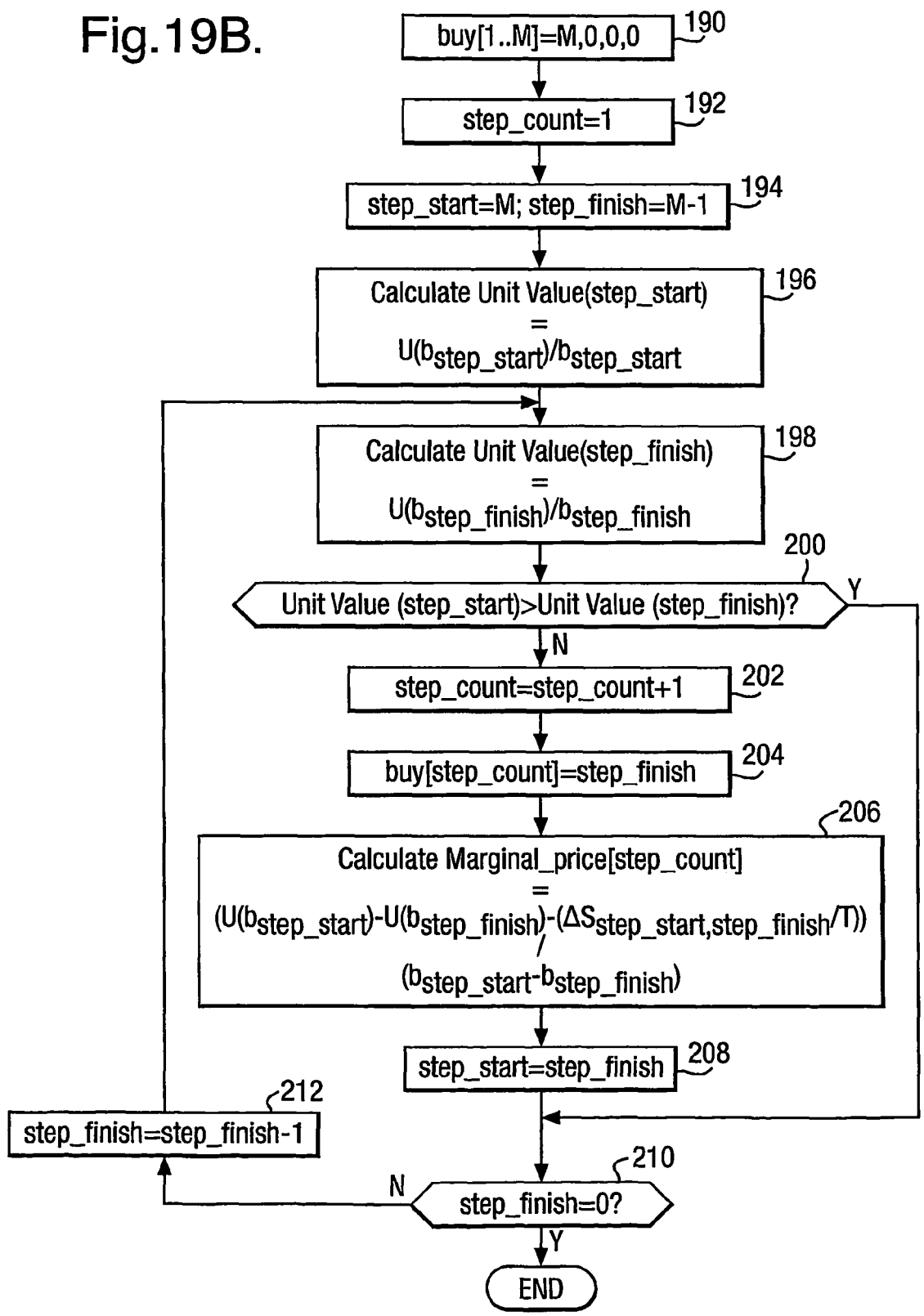
FIG. 19B shows the calculation of a sequence of indicated services followed by a purchaser using a dynamically-priced service offering in response to the price of bandwidth in that service rising.

FIG. 19A illustrates the process carried out by the bandwidth broker computer to determine the expected penalised second half surplus where a dynamically-priced service offering is used for the second half of the delivery.

To this end a block of instructions (step 372 to 380) is carried out for each of the indicated services taken from the n'th dynamically-priced service offering. That block of instructions (step 372 to 380) begins with the calculation with the probability of the m'th indicated service being selected given assuming that the n'th dynamically-priced service offering is used for the second half of the delivery. This step (372) will now be explained in more detail with reference to FIGS. 19B and 19C below.

A process for calculating a price reaction service sequence (FIG. 19B) begins with the initialisation of a price reaction service sequence array (which has a number of elements which is equal to the number of indicated services within the dynamically-priced service offering currently being considered (including the 'zero' indicated service)) such that each of the elements is set to zero except for the first which is set to the number of indicated services (step 190). This is followed by the initialisation of a step count variable to one (step 192).

Were the price of the n'th service offering to be set to zero then the indicated service which offered the highest instantaneous surplus would necessarily be that associated with the highest bandwidth. Hence, the first element of the array is set to the number of the highest indicated service. The reaction to a rising price will then pass through one or more of the other indicated services until the price reaches such a level (this was calculated as $apex earlier) that the purchaser chooses the zeroth indicated service. It is this sequence of steps that the buyer array intends to record.

Having initialised the step count variable, a step_start variable is set equal to the number of the highest indicated service and a step_finish variable is set to the second highest indicated service (step 194). Thereafter, in step 196, the unit value of the indicated service with the highest bandwidth is calculated (step 196). It is to be noted that the unit value rises and falls with the instantaneous surplus accumulation rate in the present case since the price of the variable-bandwidth service is fixed.

Next, the unit value associated with the indicated service having the current value of the step_finish variable as an index number is found (step 198). A test is then carried out to find out whether the unit value at the step_finish is less than the unit value at the step_start (step 200). If it is, then a purchaser operating at the m'th indicated service would not choose to use the (m'−1)th indicated service since he or she would prefer the m'th indicated service. If, however, the opposite is true then a rising price will cause the purchaser to purchase the (m'−1)th indicated service in preference to the mth indicated service. In that case, a step update block of instructions (step 202 to step 208) is carried out. That block of instructions begins with the incrementing of the step count variable to indicate that another step in the purchasers price reaction sequence has been found (step 202). This is followed by an entry being made in the buy array to indicate that the (m'−1)th indicated service would be visited by a purchaser in reaction to a rising price (step 204). Thereafter, the marginal price at which the purchaser would move from the mth indicated service to the (m'−1)th indicated service is found (step 206). As when calculating $apex, account may be taken of the undesirability of changing indicated service if only a short period of the delivery remains. The block of instructions finishes with the setting of the step_start variable to the current value of step_finish (step 208) thereby causing the following iteration of the loop to relate to the next step in the users price reaction sequence. The loop of instructions (step 198 to step 208) is then repeated until the step considered is that which causes the purchaser to cease purchasing bandwidth altogether.

Figure 19C:
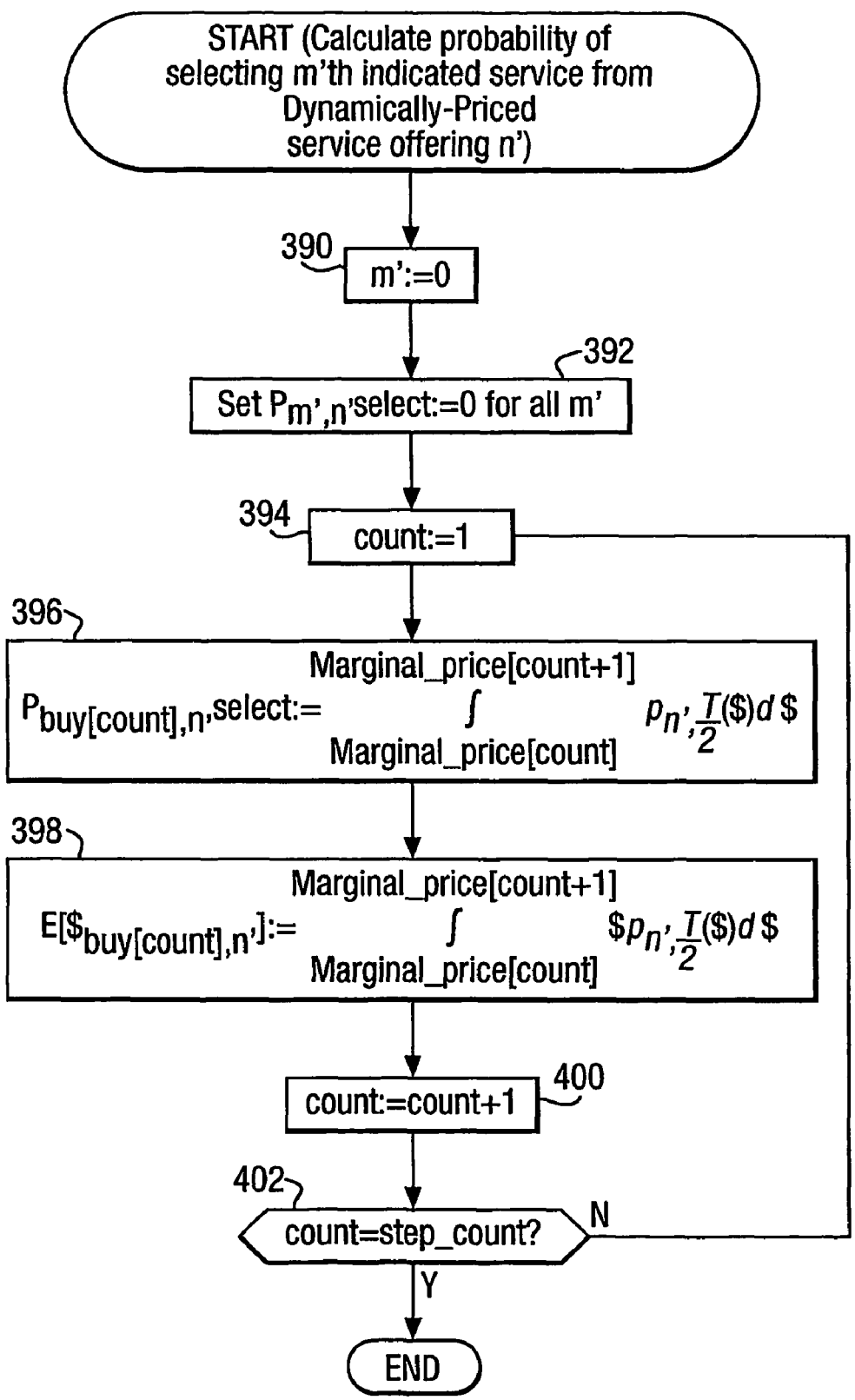
FIG. 19C shows the calculation of the probability of a purchaser choosing an indicated service for the second-half of a content file delivery assuming that a dynamically-priced service offering is used in the second-half.
Figure 20A:
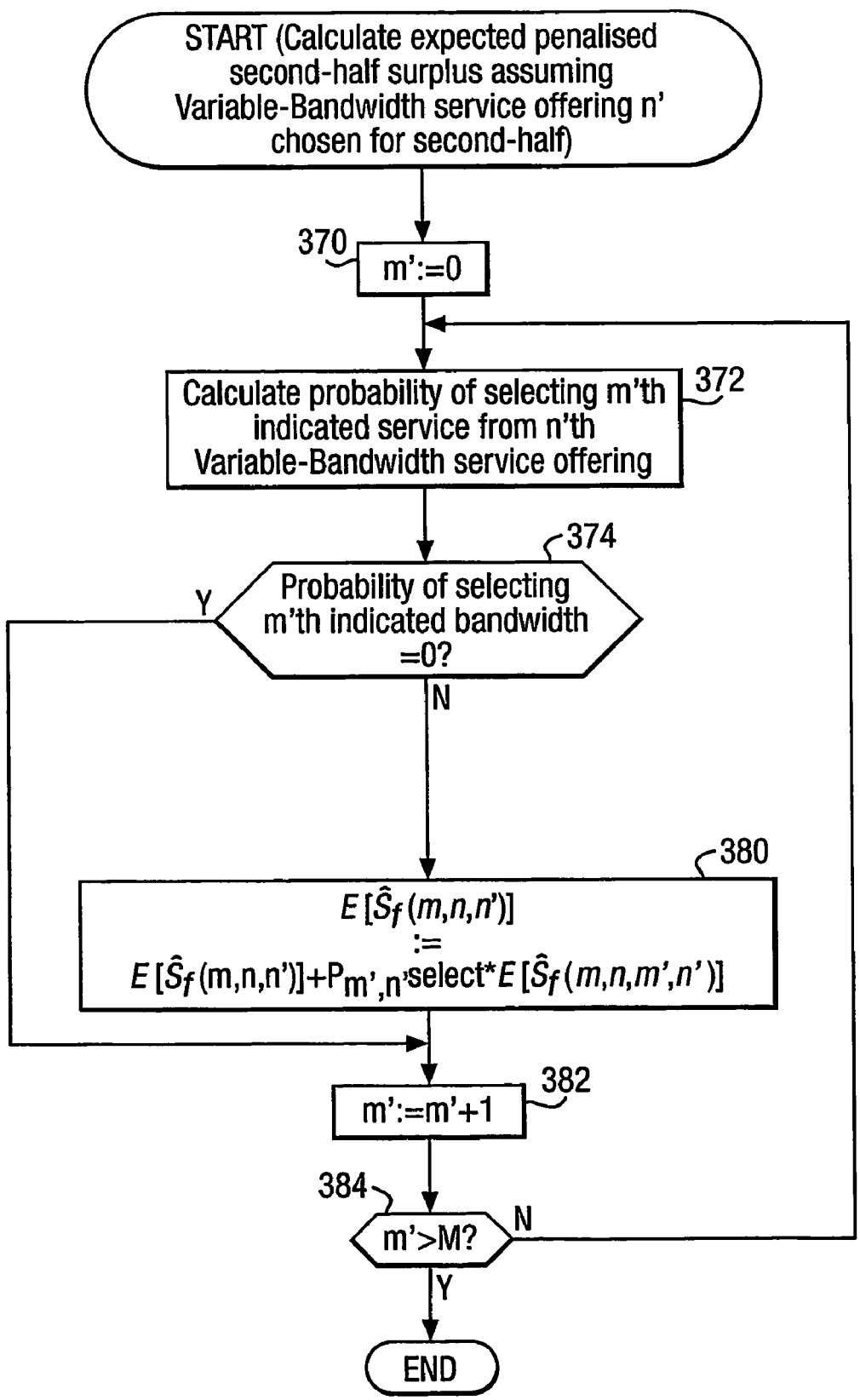
FIG. 20A shows the calculation of expected penalised second-half session surplus where a variable-bandwidth service type is used for the second half of a content file delivery.
Figure 20B:
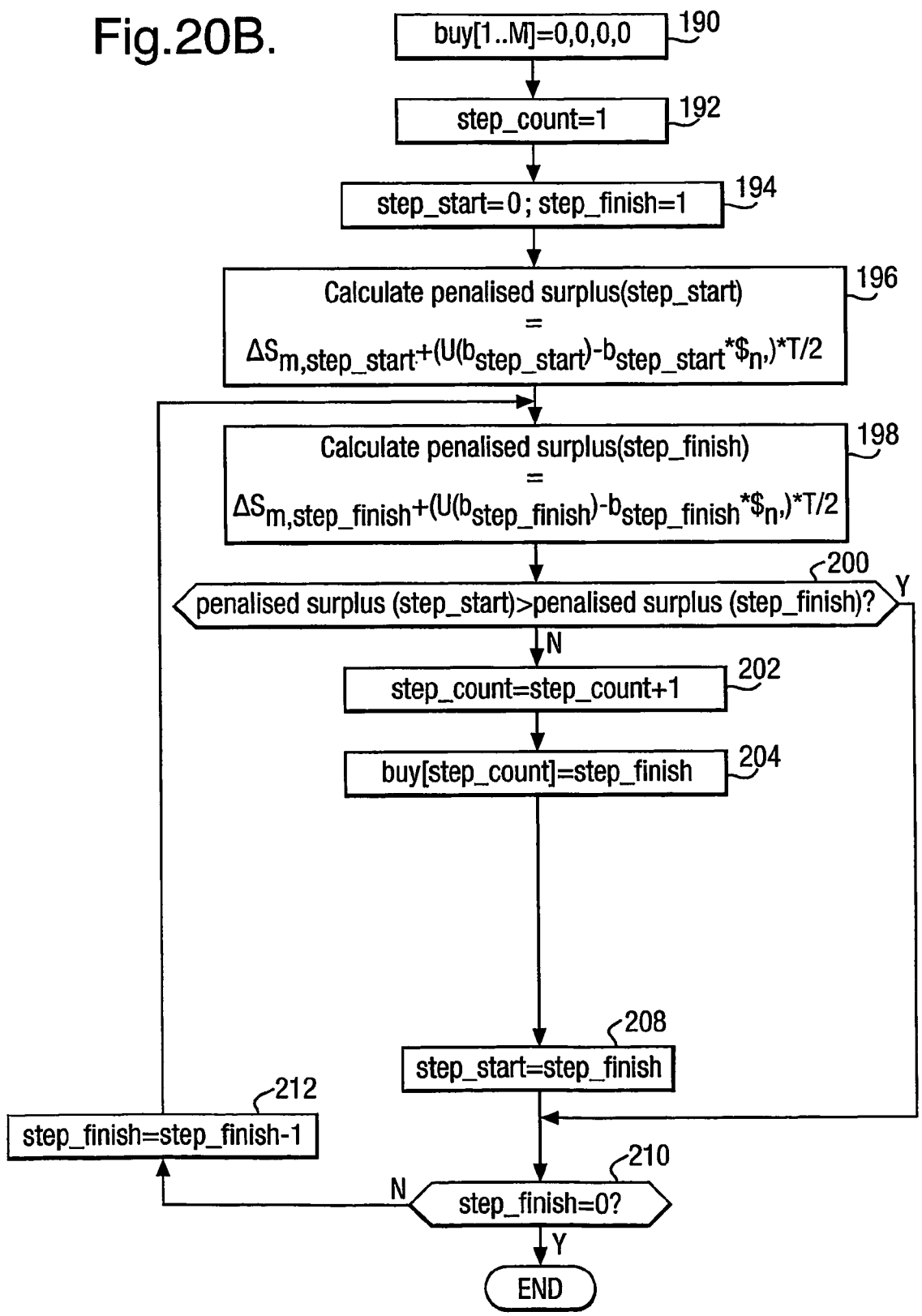
FIG. 20B shows the calculation of a sequence of indicated services followed by a purchaser using a variable-bandwidth service offering in response to the amount of bandwidth available for a content file delivery rising.
Figure 20C:
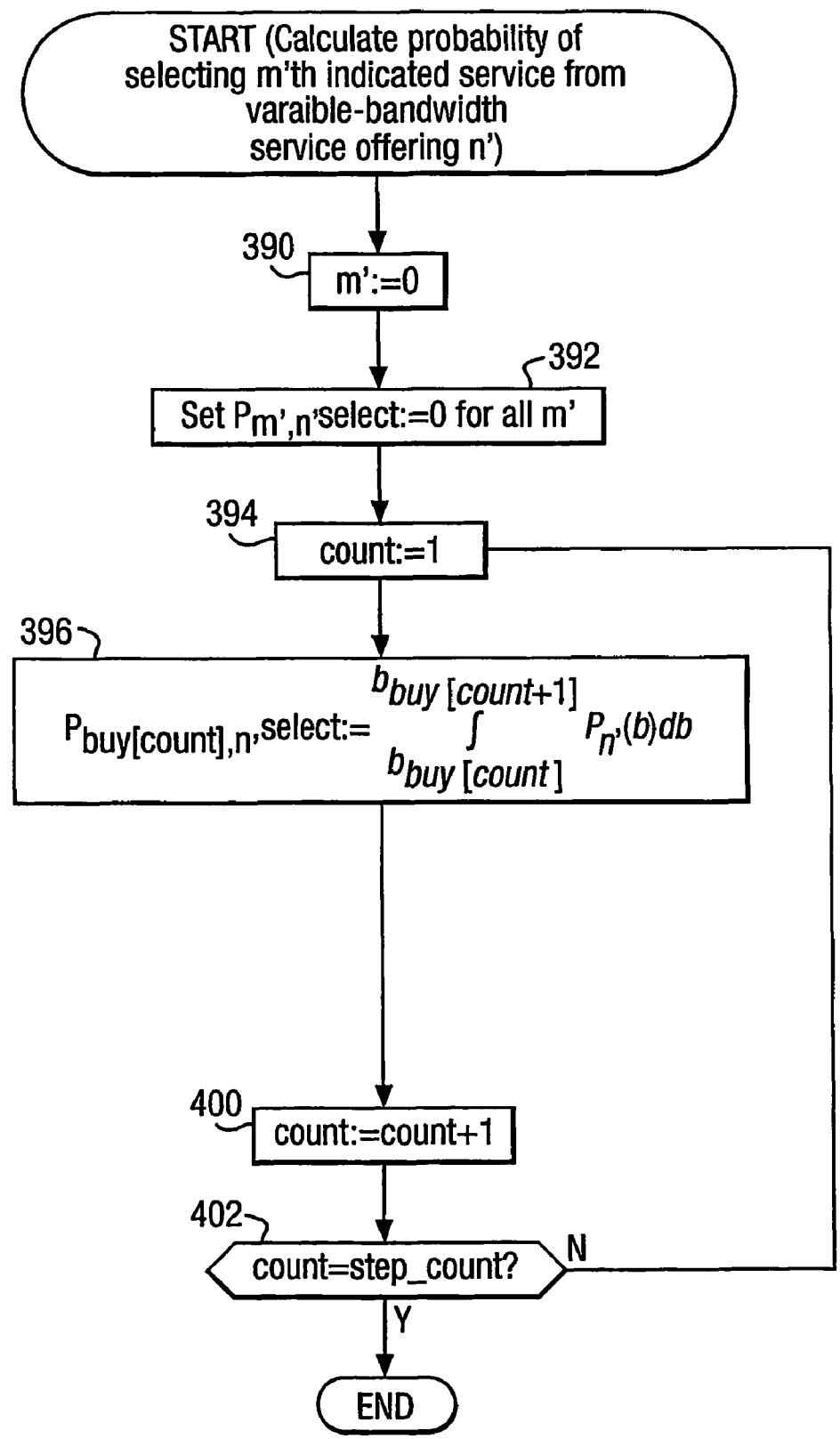
FIG. 20C shows the calculation of the probability of a purchaser choosing an indicated service for the second-half of a content file delivery assuming that a variable-bandwidth service offering is used in the second-half.
Figure 21:
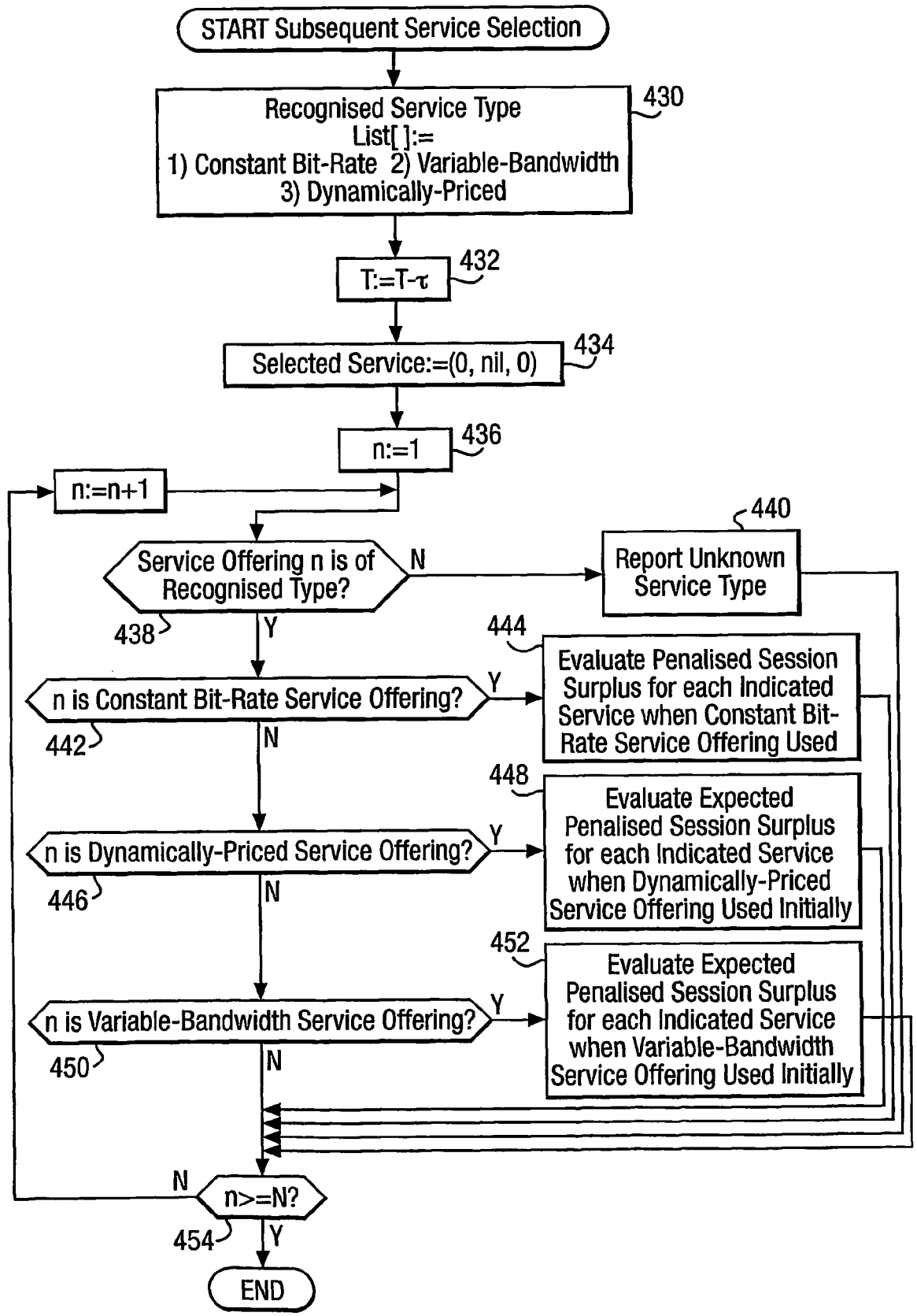
FIG. 21 shows the selection of a service type at a subsequent service selection point during the delivery.
Figure 22:
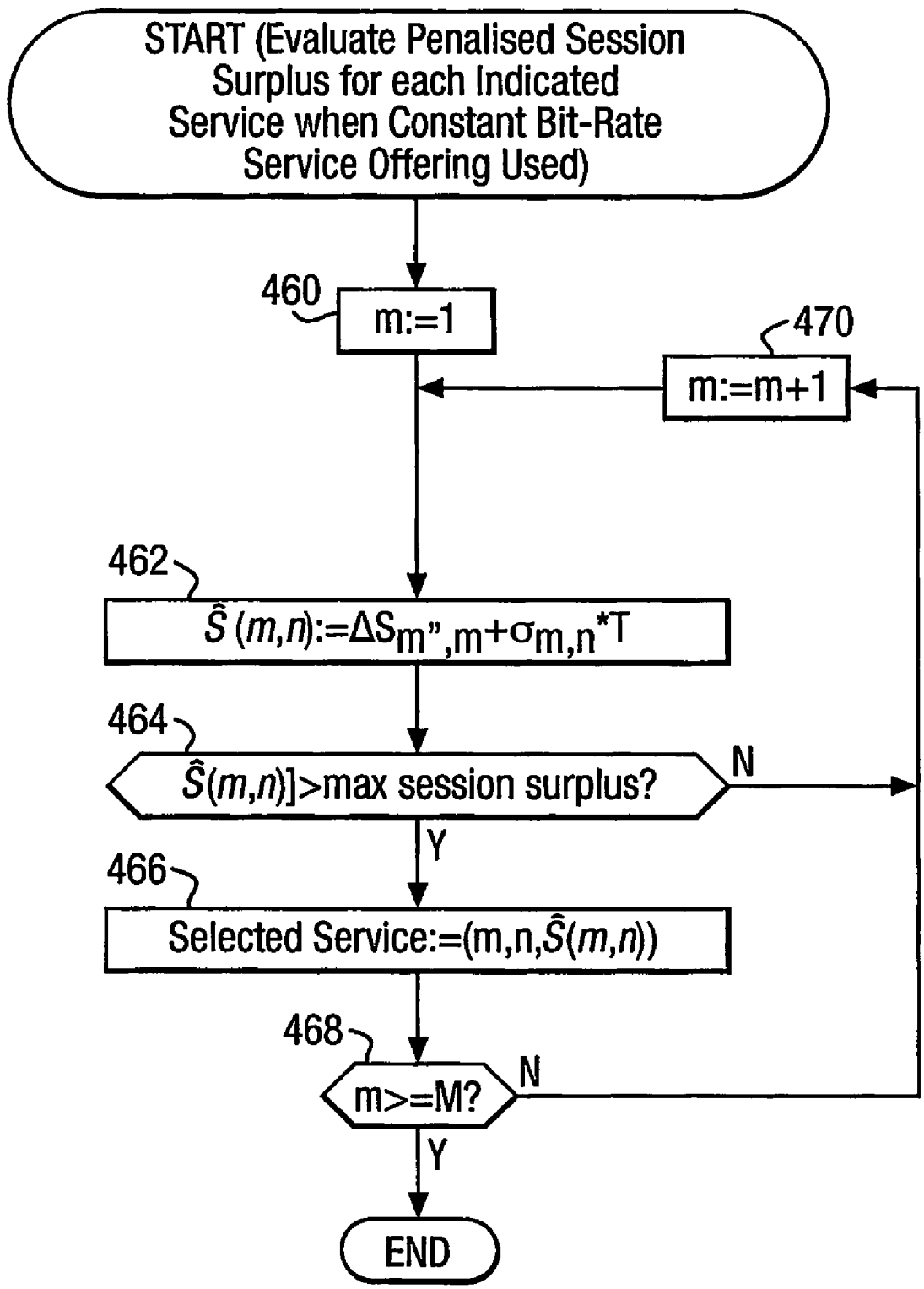
FIG. 22 shows a process used to evaluate a penalised session surplus for each indicated service when a constant bit-rate service offering is used immediately after the subsequent service selection point.
Figure 23:
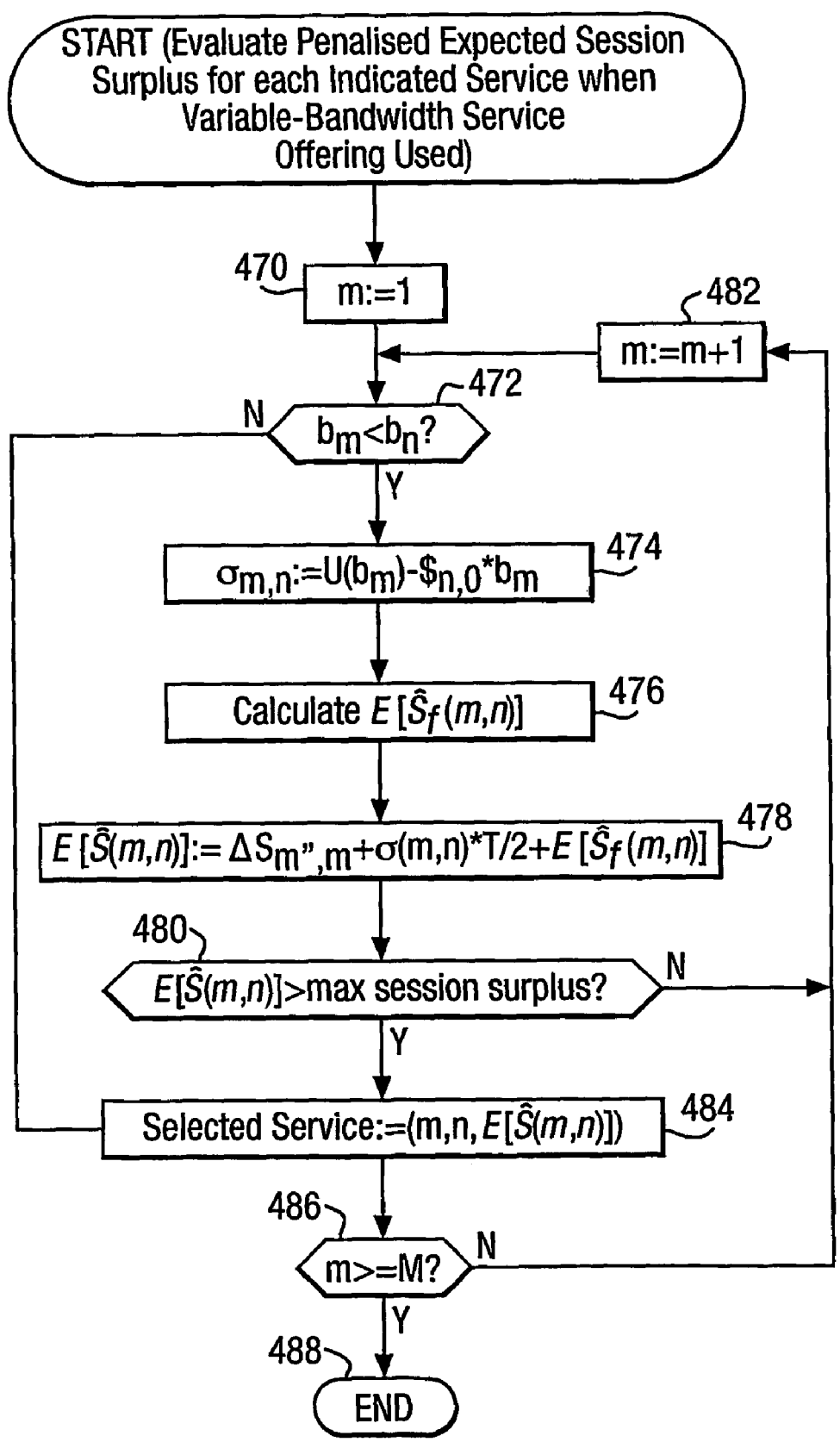
FIG. 23 shows a process used to evaluate a penalised session surplus for each indicated service when a variable-bandwidth service offering is used immediately after the subsequent service selection point.

Once the reaction of the purchaser to rising price in a dynamically-priced service offering has been calculated, it is possible to calculate probability of a purchaser choosing a given indicated service from a dynamically-priced service offering. The process for doing this is illustrated in FIG. 19C. The process begins with the initialisation of an indicated service index number to zero (step 390). This is followed by an initialisation of a selection probability array (which again has as many elements as there are indicated services) to zero (step 392).

A loop of instructions (step 394 to step 402) is then entered which is repeated as many times as there are steps in the purchaser's price reaction sequence. In the first of a block of instructions so repeated, the probability of selecting the member of the purchasers price reaction sequence currently being considered is found. This is calculated by substituting half the duration of the delivery as the time variable in the probability density function which represents the price in the n'th service offering and then integrating that function between the marginal price which causes a purchaser (seeking to maximise the penalised second half surplus) to drop to the indicated service currently being considered and the marginal price which causes the purchaser to drop from the indicated service currently being considered (step 396). This calculation is immediately followed by a calculation of the likely price of the n'th service offering given that the price has caused the purchaser to move to the indicated service currently being considered (step 398).

Returning now to FIG. 19A, a test (step 374) is carried out to find out whether the indicated service currently being considered would be adopted by a purchaser in any circumstance. If it would not then the process continues to the next iteration of the loop (if any). If, on the other hand, the m'th indicated service is included within the purchasers price reaction sequence then the expected second half surplus is calculated (step 376) and then modified by the addition of the product of the probability of the m'th indicated service being selected and the penalised second half surplus gained were that indicated service to be provided for the duration of the second half (step 380).

The price used in this calculation is the expected price given that price changes have caused the purchaser to select the m'th indicated service as calculated above (FIG. 19C). The above process is then repeated for each of the M'th services until an expected penalised second half surplus has been calculated.

The process for calculating the expected second half surplus gained from the variable bandwidth service offering (FIGS. 20A, 20B and 20C) is similar to that set out above for the dynamically-priced service. However, the reaction sequence found in this case is a reaction to increasing bandwidth rather than a reaction to increasing price. Note that in the Figures $\$_n$, refers to the price of bandwidth in the service offering being considered for the second half of the delivery.

Having obtained the greatest expected penalised second half surplus by the processes illustrated in FIGS. 18 to 20C, the bandwidth broker computer is able to select that service which maximises the expected session surplus. Because of the penalties incurred for choosing a lower indicated service at the half-way point, an initial service which matches the users combined requirements for stability and rate as represented by the utility penalties and the utility of the indicated services is selected.

After a period of 30 seconds, an in-delivery service selection is carried out. This service selection is carried out identically to the initial service selection described above save for a penalty being added (in step 462 in FIG. 22) to those subsequent service selections in accordance with the penalty set out by the purchaser in the quality of delivery specification (FIG. 7) and the calculations involving the duration of the delivery in the initial service selection being replaced with calculations involving the duration of the remainder of the delivery in subsequent service selections.

Returning now to FIG. 8, having determined the service to be applied to the content file transfer to the requesting user (in either the initial evaluation or subsequent re-evaluations), the agent computer A1 sends (step 8) a message indicating the source and destination IP addresses and TCP ports of the content file transfer and the Diff-Serv marking associated with the selected indicated service to the marker 164.

In the meantime, the caching server C1 sets up a streaming session with the user's PC 152. The caching server divides the content file into packets and starts sending (step 10) those packets to the user's PC 152 via the marker 164. Once the marker 164 has received the Diff-Serv marking message from the bandwidth broker computer B1, it recognises packets belonging to the content file transfer (the IP address and User Datagram Protocol (UDP) port in the marking instruction will match the corresponding parameters in packets belonging to the content file transfer—note that, since it is operating as a transparent cache, the caching server operates to use the origin server's address as the source address of the packets). The marker marks packets so recognised with a Diff-Serv codepoint that corresponds to the selected bandwidth.

The marked packets are forwarded to the CMTS 146 which will schedule the packets sent from it in accordance with the diff-serv codepoints they contain.

It will be seen how the above described embodiment enables a single quality of delivery specification to be used in the selection of a suitable service type, even when the selection is between variable bandwidth and variable price service types. In particular, on the basis of the quality of delivery specification data (FIG. 4), the bandwidth broker computer B2 of the DSL network running the process explained above is able to select a service from either the variable price service offering or the constant bit-rate service offering. Also, the same process carried out by the bandwidth broker computer B1 of the cable network is, on the basis of the same quality of delivery specification, able to choose an indicated service from one of the three variable bandwidth service offerings.

A large number of variations might be made to the above embodiment without preventing it achieving the benefits of the present invention. These variations include (but are not limited to):

i) Instead of the values k and C which parameterise a predetermined form of probability density function, the local/regional network operator might supply data which tabulates the value of a probability density function obtained from empirical observations of the bandwidth or price behaviour of each service offering;

ii) a single bandwidth broking computer could carry out the process for both the cable network and the DSL network;

iii) a single quality of delivery policy (FIG. 4) and a single agent computer could be used for different access networks of similar or different technologies;

iv) The further into a session premature termination occurs, the more negative impact it has. In preferred embodiments, the termination penalty, $\Delta S_{m,0}$, varies with time. E.g. $\Delta S_{m,0} = a_m T + b_m$.

To allow for more accurate approximations of this kind in the future embodiments might allow for the formula to be specified (in addition to the specification of any parameters such as a and/or b). Alternatively the formula may be stored with curves used to determine the values of $a_{brm}$ and $b_{brm}$;

v) in the above-described embodiments the quality of delivery is assumed to accord with the amount of capacity provided to a delivery at a bottleneck node in that delivery. In other embodiments, the quality of delivery might be judged by the delay in delivering packets form the caching computer to the customer's PC. In a similar way to the way the above embodiment chooses a network service which offers a desired level of stability in supplied bandwidth, in such other embodiments, the network service chosen could be that which offers a suitable variation in the delay experienced by packets in the delivery—embodiments might also take both measures of quality of delivery into account;

vi) in the above embodiment, the agent, cache and bandwidth broker computers were separate from one another. In alternative embodiments, any two or all of these functions could be carried out by a single computer;

vii) in the above embodiment, the available bandwidth was communicated as part of the service offering data (FIGS. 11A and 11B)—it could alternatively be communicated by means of explicit congestion notification marks set in the packets of the delivery by routers experiencing congestion. Price could also be communicated in this way.

The invention claimed is:

1. A method of operating a communications network controller to control a communications network which offers services including a dynamically-priced service and a fixed-price service, said method comprising operating said communications network controller to:

store utility data representing a utility of one or more corresponding levels of communication resource available from said communications network for a communication;

store resource stability data indicative of a stability in the amount of said communications resource provided by said communications network when operated to provide said fixed price service for said communication;

store price stability data indicative of a stability in the price of said dynamically-priced service offered by said communications network;

calculate, from said resource stability data, a measure of a likelihood of a predetermined variation occurring in an amount of resource provided by said communications network for said communication when operated to provide said fixed price service at a future time during said communication;

calculate, in dependence upon said stored utility data, a measure of a likelihood of the price of said dynamically-priced service reaching a marginal price which would result in said predetermined variation occurring in the amount of resource provided for said communication by said communications network when operated to provide said dynamically-priced service at a future time during said communication;

select between said dynamically-priced service and said fixed-price service in dependence upon calculated likelihood measures for said dynamically-priced service and said fixed price service; and control said communications network to provide said selected service for said communication.

2. A method according to claim 1 wherein
said select involves a determination of what service to request for said communication.

3. A method according to claim 1 wherein
said select involves a determination of what service to provide for said communication.

4. A method of sharing, between a plurality of communications, resources of a communications network offering a plurality of communication services, said method comprising carrying out a method according to claim 3 for each of said plurality of communications.

5. A method according to claim 1 in which said resource stability data comprises data defining a probability density function defining a likelihood of the amount of resource available from said communications network for said communication lying within a range of values at a time after said selection.

6. A method according to claim 5 wherein
a maximum of said probability density function is set to the amount of resource available from said communications network for said communication at the time of said selection.

7. A method according to claim 1 in which said price stability data comprises data defining a probability density function defining the likelihood of the price of resource for said communication lying within a range of values at a time after said selection.

8. A method according to claim 7 wherein
a maximum of said probability density function is set to the price of resource for said communication at the time of said selection.

9. A method according to claim 1 further comprising operating said communications network controller to:

store stability desirability data comprising one or more utility indications each comprising a transmission rate and an associated utility accumulation rate for that rate;
wherein said likelihood calculation involves calculating measures of the likelihood of said communications network when operated to provide said service type providing said communication with said transmission rate at said future time; and said selection involves calculating an expectation of a surplus which would be accumulated by said communication over a predetermined period were said communications network controller to select said service type for said communication, the calculation of said expectation of a surplus involving calculating the sum of products of said likelihood, the associated utility accumulation rate and a duration of said predetermined period.

10. A method according to claim 9 wherein
said selection involves selecting the network service which offers a highest expectation of surplus for said communication over said predetermined period.

11. A method according to claim 9 wherein
said likelihood determination involves calculating the likelihood that a variable-bandwidth falls below said transmission rate.

12. A method according to claim 9 wherein
said communications network offers a constant bit-rate service type, said expectation of a surplus over said predetermined period being calculated as the utility accumulation rate less the price, times the duration of said predetermined period.

13. A method according to claim 9 wherein
said predetermined time period equals a duration of the communication after said selection.

14. A method according to claim 9 wherein:
said stability desirability data comprises a plurality of said utility indications and penalty data representing a utility penalty data associated with said communications network moving from one of those transmission rates for said communication to a lower one of those transmission rates for said communication; and said calculation of said expectation of a surplus involves subtraction of utility penalties associated with said communications network moving from an initial rate for said communication at a time of selection to a different rate for said communication after said future time.

15. A method according to claim 1, said method further comprising operating said communications network controller to:

store one or more acceptable risk indications representing the acceptable risk of said predetermined variation occurring in the amount of resource provided by said communications network for said communication during said communication;

select, in dependence upon a comparison of said calculated likelihood measures and said acceptable risk indications, a network service for said communication; and control said communications network to provide said selected network service for said communication.

16. A method according to claim 1 wherein
said predetermined variation is a variation which leads to said communication being terminated prematurely.

17. A non-transitory program storage device readable by a processing apparatus, said storage device embodying a program of instructions executable by the processor to perform the method according to claim 1.

18. A network service selection apparatus comprising:
a non-transitory storage medium having recorded therein processor readable code executable to select a network service for a communication, said code comprising:
fixed price service stability calculation code executable to calculate from resource stability data, a measure of a likelihood of a predetermined variation occurring in an amount of resource provided for said communication by said fixed price service at a future time during said communication;

dynamically-priced service stability calculation code executable to calculate in dependence upon stored utility data, a measure of a likelihood of the price of said dynamically-priced service reaching a marginal price which would result in said predetermined variation occurring in the amount of resource provided for said communication by said dynamically-priced service at a future time during said communication;

network service selection code executable to select between said dynamically-priced service and said fixed-price service in dependence upon calculated likelihood measures for said dynamically-priced service and said fixed price service.

19. A non-transitory program storage device readable by a processing apparatus, said storage device embodying a program of instructions executable by the processor to perform the method according to claim 18.

* * * * *